(12) United States Patent
Tovey et al.

(10) Patent No.: US 12,293,485 B2
(45) Date of Patent: May 6, 2025

(54) SUPER RESOLUTION UPSCALING

(71) Applicants: ADVANCED MICRO DEVICES, INC., Santa Clara, CA (US); ATI TECHNOLOGIES ULC, Markham (CA)

(72) Inventors: Steven Tovey, Milton Keynes (GB); Jimmy Stefan Petersson, Stockholm (SE); Thomas Arcila, Paris (FR); Zhuo Chen, Markham (CA); Stephan Hodes, Munich (DE); Colin Riley, Edinburgh (GB); Sylvain Daniel Julien Meunier, Annecy (FR)

(73) Assignees: Advanced Micro Devices, Inc., Santa Clara, CA (US); ATI TECHNOLOGIES ULC, Markham (CA)

( * ) Notice: Subject to any disclaimer, the term of this patent is extended or adjusted under 35 U.S.C. 154(b) by 375 days.

(21) Appl. No.: 17/976,192

(22) Filed: Oct. 28, 2022

(65) Prior Publication Data

US 2023/0298133 A1 Sep. 21, 2023

Related U.S. Application Data

(60) Provisional application No. 63/320,940, filed on Mar. 17, 2022.

(51) Int. Cl.
*G06T 3/4053* (2024.01)
*G06T 7/246* (2017.01)

(52) U.S. Cl.
CPC ............ *G06T 3/4053* (2013.01); *G06T 7/248* (2017.01)

(58) Field of Classification Search
CPC ......... G06T 3/4053; G06T 7/248; G06T 7/50; G06T 7/90; G06T 2207/10016; G06T 2207/10024
See application file for complete search history.

(56) References Cited

U.S. PATENT DOCUMENTS 12,164,704 B2 * 12/2024 Na .................. G06F 3/0325
2012/0287139 A1 11/2012 Wyatt
(Continued)

FOREIGN PATENT DOCUMENTS

DE 102021125897 A1 * 4/2022 ............ G06T 5/002
KR 100441079 7/2004
(Continued)

OTHER PUBLICATIONS

International Preliminary Report on Patentability mailed Sep. 26, 2024 for PCT/US2023/015535, 7 pages.
International Search Report and Written Opinion mailed Jun. 29, 2023 for PCT/US2023/015535, 11 pages.
U.S. Appl. No. 18/236,137, filed Aug. 21, 2023 listing Jimmy Stefan Petersson et al., as inventors, Entitled "Multi-Channel Disocclusion Mask for Interpolated Frame Recertification", 52 pages.
(Continued)

*Primary Examiner* — Charles T Shedrick

(57) ABSTRACT

A first frame of a video stream rendered at a first resolution is obtained. A second frame of the video stream upscaled to a second higher resolution is also obtained. The first plurality of pixels is upscaled to the second resolution. The upsampling generates upsampled color data for the upsampled first plurality of pixels. The upsampled color data is accumulated with a second set of color data associated with a second plurality of pixels defining the second frame to generate final color data for the upsampled first plurality of pixels. Color data of the second set of color data associated with a pixel lock contributes more to the final color data than corresponding color data of the upsampled color data. The upsampled first plurality of pixels is stored with the final color data as an upscaled frame representing the first frame at the second resolution.

20 Claims, 22 Drawing Sheets

(56) References Cited

U.S. PATENT DOCUMENTS

| | | | |
|---|---|---|---|
| 2012/0328210 A1* | 12/2012 | Fattal | G06T 3/403 |
| | | | 382/264 |
| 2015/0023611 A1 | 1/2015 | Salvador et al. | |
| 2015/0036917 A1* | 2/2015 | Nanri | G01C 3/085 |
| | | | 382/154 |
| 2015/0297949 A1* | 10/2015 | Aman | G06T 7/246 |
| | | | 348/157 |
| 2017/0206638 A1 | 7/2017 | Fainstain | |
| 2018/0276824 A1 | 9/2018 | Haraden et al. | |
| 2019/0206121 A1 | 7/2019 | Jin | |
| 2020/0202594 A1 | 6/2020 | Saleh et al. | |
| 2020/0311890 A1 | 10/2020 | Smirnov et al. | |
| 2021/0224949 A1 | 7/2021 | Chalfin et al. | |
| 2021/0383169 A1 | 12/2021 | Wang et al. | |
| 2022/0038653 A1 | 2/2022 | Reda et al. | |
| 2023/0224447 A1 | 7/2023 | Ward | |

FOREIGN PATENT DOCUMENTS

| | | | | |
|---|---|---|---|---|
| KR | 100914312 | | 8/2009 | |
| KR | 10-2017-0066844 | | 6/2017 | |
| WO | WO-2005099423 A2 * | 10/2005 | | G01S 3/7864 |
| WO | WO-2014177726 A2 * | 11/2014 | | G06F 3/0416 |

OTHER PUBLICATIONS

U.S. Appl. No. 17/976,217, filed Oct. 28, 2022 listing Steven Tovey et al. as inventors, Entitled "Locking Mechanism for Image Classification", 85 pages.

International Preliminary Report on Patentability mailed Sep. 26, 2024 for PCT/US2023/015533, 6 pages.

International Search Report and Written Opinion issued in Application No. PCT/2023/015533, mailed Jul. 7, 2023, 9 pages.

U.S. Appl. No. 18/616,790, filed Mar. 26, 2024 listing Colin Riley et al., as inventors, Entitled "Motion Vectors Based on Dynamic Maximum Supported Motion", 28 pages.

U.S. Appl. No. 18/616,792, filed Mar. 26, 2024 listing Colin Riley et al., as inventors, Entitled "Motion Vectors Based on Regions of Interest", 30 pages.

U.S. Appl. No. 18/535,171, filed Dec. 11, 2023 listing Jimmy Stefan Petersson as inventor, Entitled "Motion Vector Field Generation for Frame Interpolation", 34 pages.

U.S. Appl. No. 18/615,997, filed Mar. 25, 2024 listing Colin Riley et al., as inventors, Entitled "Time-Adjusted Interpolated Frame Display", 28 pages.

International Search Report and Written Opinion mailed Oct. 15, 2024 for PCT/US2024/034145, 8 pages.

* cited by examiner

SUPER RESOLUTION UPSCALING

BACKGROUND

Spatial upscalers implemented in a graphics pipeline typically take frames that are rendered at a lower-than-native resolution for improving performance and upscales these frames to the display's native resolution. Although easy to integrate, spatial upscalers can have certain shortcomings. For example, conventional spatial upscaling approaches usually require a high quality anti-aliased source image. Thus, games without anti-aliasing had to implement anti-aliasing, which made integrating the conventional approaches more time consuming. Also, if the anti-aliasing is poorly implemented, a conventional spatial upscaler will typically generate an inferior upscaled output. Moreover, upscaling quality is a function of the source resolution input. When the source resolution is very low, there is insufficient information to draw upon to regenerate thin detail, resulting in additional artifacts, such as shimmering and poor edge reconstruction.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

As described below, an example approach provides improved upscaling by using temporal feedback to reconstruct high-resolution images while maintaining and improving image quality compared to native rendering. This approach can enable "practical performance" for costly render operations, such as hardware ray tracing.

Figure 1:
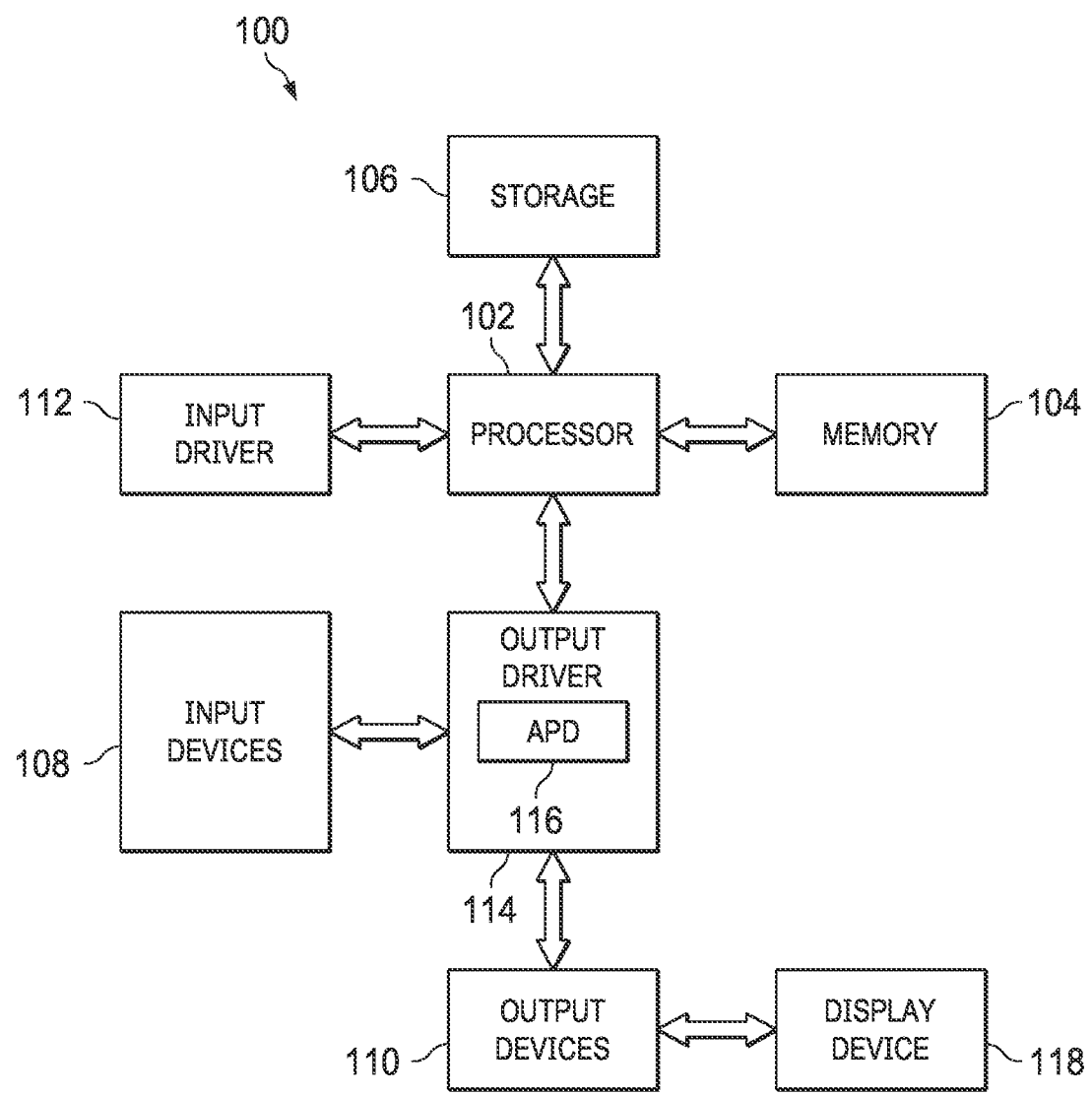
FIG. 1 is a block diagram of an example device for implementing the super resolution upscaling techniques described herein in accordance with some implementations.

FIG. 1 illustrates an example device 100 in which one or more features described herein, such as a super resolution upscaler 332 (FIG. 3), can be implemented. The device 100 includes, for example, a computer, a gaming device, a handheld device, a set-top box, a television, a mobile phone, a tablet computer, a wearable computing device, or the like. In one or more implementations, the device 100 includes one or more processors 102, memories 104, storage devices 106, input devices 108, and output devices 110. The device 100, in at least some implementations, also includes one or more input drivers 112 and one or more output drivers 114. It is understood that the device 100 can include additional components not shown in FIG. 1.

In one or more implementations, the processor 102 includes a central processing unit (CPU), a graphics processing unit (GPU), a CPU and GPU located on the same die, or one or more processor cores, wherein each processor core can be a CPU or a GPU. The CPU, in at least some implementations, includes one or more single or multi-core CPUs. In various alternatives, the memory 104 is located on the same die as the processor 102 or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, for example, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, for example, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108 and enables the processor 102 to receive input from the input devices 108. The output driver 114 communicates with the processor 102 and the output devices 110 and enables the processor 102 to send output to the output devices 110. It is noted that the input driver 112 and the output driver 114 are optional components, and that the device 100 will operate in the same manner if the input driver 112 and the output driver 114 are not present. The device 100 also includes one or more accelerated processing devices (APDs) 116. In at least some implementations, the APD 116 is coupled to, for example, one or more display devices 118. The APD 116 can be part of or separate from the output device 110. The APD 116 accepts compute commands and graphics rendering commands from processor 102, processes those compute and graphics rendering commands, and provides pixel output to display device 118 for display.

As described in further detail below, the APD 116 includes one or more parallel processing units to perform computations in accordance with a single-instruction-multiple-data (SIMD) paradigm. In one or more implementations of the APD 116 is used to implement a GPU and, in these implementations, the parallel processing units are referred to as shader cores or streaming multi-processors (SMXs). Each parallel processing unit includes one or more processing elements such as scalar and/or vector floating-point units, arithmetic and logic units (ALUs), and the like. In various implementations, the parallel processing units also include special purpose processing units (not shown), such as inverse-square root units and sine/cosine units.

Although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, any processing system that performs processing tasks in accordance with a SIMD paradigm can perform the functionality described herein. Alternatively, computing systems that do not perform processing tasks in accordance with a SIMD paradigm can perform the functionality described herein as well.

Figure 2:
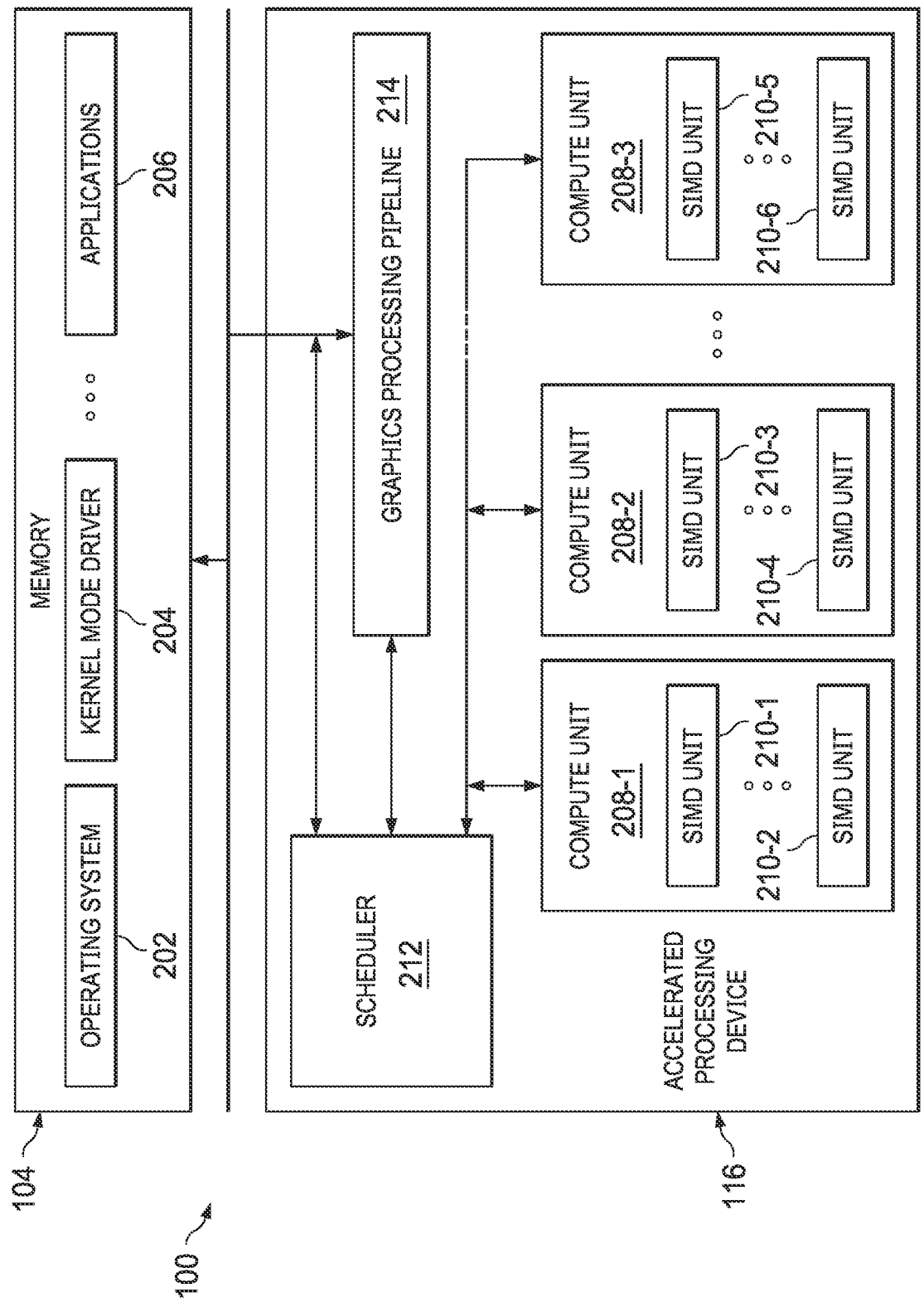
FIG. 2 is a more detailed block diagram of the example device of FIG. 1 illustrating additional details related to execution of processing tasks on one or more accelerated processing devices in accordance with some implementations.

FIG. 2 is a block diagram of the device 100 illustrating additional details related to execution of processing tasks on the APD 116. In one or more implementations, the processor 102 maintains, in system memory 104, one or more control logic modules for execution by the processor 102. The control logic modules include, for example, an operating system 202, a kernel mode driver 204, and applications 206. These control logic modules control various features of the operation of the processor 102 and the APD 116. For example, the operating system 202 directly communicates with hardware and provides an interface to the hardware for other software executing on the processor 102. The kernel mode driver 204 controls operation of the APD 116 by, for example, providing an application programming interface ("API") to software (e.g., applications 206) executing on the processor 102 to access various functionality of the APD 116. In one or more implementations, the kernel mode driver 204 also includes a just-in-time compiler that compiles programs for execution by processing components (such as SIMD units 210) of the APD 116.

In one or more implementations, the APD 116 includes any cooperating collection of hardware and/or software that perform functions and computations associated with accelerating graphics processing tasks, data parallel tasks, nested data parallel tasks in an accelerated manner with respect to resources such as conventional CPUs, conventional GPUs, and combinations thereof. Although GPUs, accelerated processing units (APUs), and general purpose graphics processing units (GPGPUs) are commonly used terms in this field, the expression "accelerated processing device (APD)" as used herein is a broader expression.

The APD 116 executes commands and programs for selected functions, such as graphics operations and non-graphics operations that may be suited for parallel processing. In one or more implementations, the APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102. For example, such commands include special instructions that are not typically defined in the instruction set architecture (ISA) of the APD 116. In at least some implementations, the APD 116 receives an image geometry representing a graphics image, along with one or more commands or instructions for rendering and displaying the image. In various implementations, the image geometry corresponds to a representation of a two-dimensional (2D) or three-dimensional (3D) computerized graphics image.

The APD 116 includes compute units 208 (illustrated as compute units 208-1 to 208-3), such as processing cores, that include one or more SIMD units 210 (illustrates as SIMD units 210-1 to 210-6) that perform operations at the request of the processor 102 in a parallel manner according to a SIMD paradigm. The SIMD paradigm is one in which multiple processing elements share a single program control flow unit and program counter and, thus, execute the same program but are able to execute that program with different data. In one example, each SIMD unit 210 includes a given number of lanes, where each lane executes the same instruction at the same time as the other lanes in the SIMD unit 210 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 208 is a work-item. Each work-item represents a single instantiation of a program that is to be executed in parallel in a particular lane. Work-items can be executed simultaneously as a "wavefront" on a single SIMD processing unit 210. One or more wavefronts are included in a "work group", which includes a collection of work-items designated to execute the same program. A work group can be executed by executing each of the wavefronts that make up the work group. In alternatives, the wavefronts are executed sequentially on a single SIMD unit 210 or partially or fully in parallel on different SIMD units 210. Wavefronts represent the largest collection of work-items that can be executed simultaneously on a single SIMD unit 210. Thus, if commands received from the processor 102 indicate that a particular program is to be parallelized to such a degree that the program cannot execute on a single SIMD unit 210 simultaneously, then that program is broken up into wavefronts which are parallelized on two or more SIMD units 210 or serialized on the same SIMD unit 210 (or both parallelized and serialized as needed). A scheduler 212 performs operations related to scheduling various wavefronts on different compute units 208 and SIMD units 210.

The parallelism afforded by the one or more compute units 208 is suitable for graphics related operations such as pixel value calculations, vertex transformations, tessellation, geometry shading operations, and other graphics operations. Thus, in one or more implementations, a graphics processing pipeline 214, which accepts graphics processing commands from the processor 102, provides computation tasks to the compute units 208 for execution in parallel. Some graphics pipeline operations, such as pixel processing and other parallel computation operations, require that the same command stream or compute kernel be performed on streams or collections of input data elements. Respective instantiations of the same compute kernel are executed concurrently on multiple SIMD 210 units in the one or more compute units 208 to process such data elements in parallel. As referred to herein, for example, a compute kernel is a function containing instructions declared in a program and executed on an APD compute unit 208. This function is also referred to as a kernel, a shader, a shader program, or a program.

The graphics processing pipeline 214 includes multiple stages (not shown in FIG. 2 for brevity) configured for concurrent processing of different primitives in response to a draw call. In one or more implementations, stages of the graphics processing pipeline 214 concurrently process different primitives generated by an application 206, such as a video game. When geometry data is submitted to the graphics processing pipeline 214, hardware state settings are chosen to define a state of the graphics processing pipeline 128. Examples of state include a rasterizer state, a blend state, a depth stencil state, a primitive topology type of the submitted geometry, and the shaders (e.g., vertex shader, domain shader, geometry shader, hull shader, pixel shader, and the like) that are used to render the scene. The shaders that are implemented in the graphics pipeline state are represented by corresponding byte codes. In some cases, the information representing the graphics pipeline state is hashed or compressed to provide a more efficient representation of the graphics pipeline state.

The APD 116 is configured to implement features of the present disclosure by executing a plurality of functions as described in more detail below. For example, the APD 116 is configured to implement a super resolution upscaler 332 that receives a low-resolution rendered frame 502 of video stream. The super resolution upscaler 332 spatially upscales the low-resolution rendered frame 502 by using temporal feedback (e.g., a previously upscaled frame(s) of the video stream) to reconstruct a high-resolution frame 508 representing the rendered frame.

Figure 3:
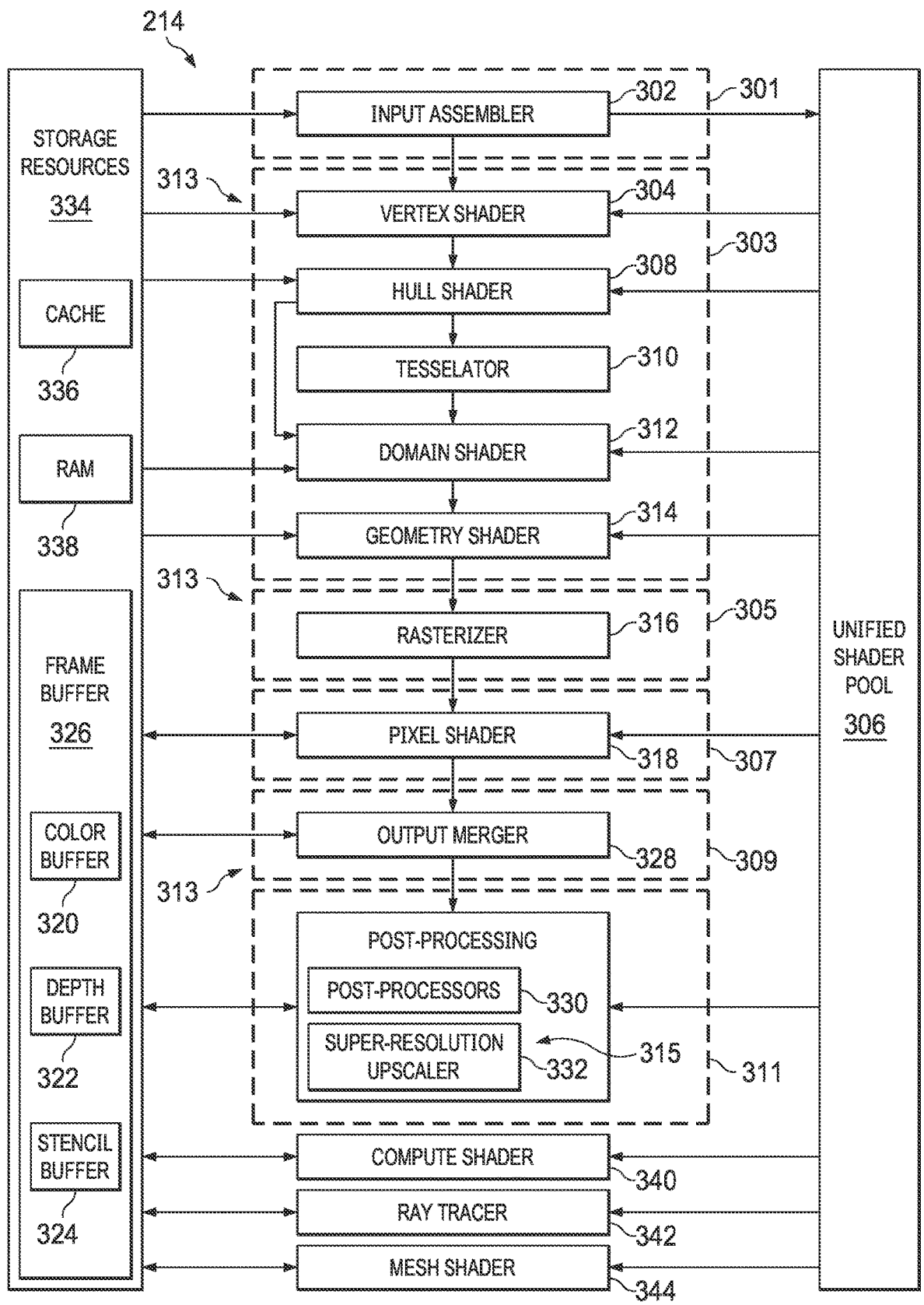
FIG. 3 is a block diagram of the graphics pipeline of FIG. 2 in accordance with some implementations.

FIG. 3 illustrates additional details of the graphics pipeline 214 illustrated in FIG. 2 according to one or more implementations. As described below, the graphics pipeline 214 is capable of performing super resolution upscaling using temporal feedback (e.g., data associated with one or more previously upscaled frames) to reconstruct high-resolution images while maintaining or improving image quality compared to native rendering. In at least some implementations, the graphics pipeline 214 is implemented in the APD 116 shown in FIG. 1 and FIG. 2. It should be understood that the super resolution upscaling techniques described herein are also applicable to other pipeline configurations.

In one or more implementations, the graphics processing pipeline 214 is configured to render graphics as images that depict a scene which has three-dimensional geometry in virtual space (also referred to herein as "world space"), but potentially a two-dimensional geometry. The graphics processing pipeline 214 typically receives a representation of a three-dimensional scene, processes the representation, and outputs a two-dimensional raster image. These stages of graphics processing pipeline 214 process data that is initially properties at end points (or vertices) of a geometric primitive, where the primitive provides information on an object being rendered. Typical primitives in three-dimensional graphics include triangles and lines, where the vertices of these geometric primitives provide information on, for example, x-y-z coordinates, texture, and reflectivity.

The graphics pipeline 214 has access to storage resources 334 (also referred to herein as "storage components") such as a hierarchy of one or more memories or caches that are used to implement buffers and store vertex data, texture data, and the like. The storage resources 334 are implemented, for example, using some implementations of the system memory 104 shown in FIG. 1 and FIG. 2. Some implementations of the storage resources 334 include (or have access to) one or more caches 336, one or more random access memory units 338, video random access memory unit(s) (not shown), one or more processor registers (not shown), and the like, depending on the nature of data at the particular stage in rendering. Accordingly, it is understood that storage resources 334 refers to any processor accessible memory utilized in the graphics processing pipeline 214.

The graphics processing pipeline 214 includes stages that each performs specific functionality. The stages represent subdivisions of functionality of the graphics processing pipeline 214. Each stage is implemented partially or fully as shader programs executing in programmable processing units, such as the SIMD units 210 of FIG. 2, or partially or fully as fixed-function, non-programmable hardware external to the programmable processing units. Stages 301 and 303 represent the front end geometry processing portion of the graphics processing pipeline 214 prior to rasterization. Stages 305 to 311 represent the back end pixel processing portion of the graphics processing pipeline 214.

In an input assembler stage 301 of the graphics pipeline 214, an input assembler 302 is configured to access information from the storage resources 334 that is used to define objects that represent portions of a model of a scene. For example, in various implementations, the input assembler stage 220 reads primitive data (e.g., points, lines and/or triangles) from user-filled buffers (e.g., buffers filled at the request of software executed by the processor 102, such as an application 206) and assembles the data into primitives that will be used by other pipeline stages of the graphics processing pipeline 200. As used herein, the term "user" refers to an application 206 or other entity that provides shader code and three-dimensional objects for rendering to the graphics processing pipeline 214. The term "user" is used to distinguish over activities performed by the APD 116. The input assembler 302 assembles vertices into several different primitive types (such as line lists, triangle strips, or primitives with adjacency) based on the primitive data include in the user-filled buffers and formats the assembled primitives for use by the rest of the graphics processing pipeline 214.

In one or more implementations, the graphics processing pipeline 214 operates on one or more virtual objects defined by a set of vertices set up in world space and having geometry that is defined with respect to coordinates in the scene. For example, the input data utilized in the graphics processing pipeline 214 includes a polygon mesh model of the scene geometry whose vertices correspond to the primitives processed in the rendering pipeline in accordance with aspects of the present disclosure, and the initial vertex geometry is set up in the storage resources 334 during an application stage implemented by a CPU.

In a vertex processing stage 303 of the graphics pipeline 214, one or more vertex shaders 304 process vertexes of the primitives a by the input assembler 302. For example, a vertex shader 304 receives a single vertex of a primitive as input and outputs a single vertex. The vertex shader 304 performs various per-vertex operations such as transformations, skinning, morphing, and per-vertex lighting. Transformation operations include various operations to transform the coordinates (e.g., X-Y coordinate and Z-depth values) of the vertices. These operations include one or more of modeling transformations, viewing transformations, projection transformations, perspective division, and viewport transformations. Herein, such transformations are considered to modify the coordinates or "position" of the vertices on which the transforms are performed. Other operations of the vertex shader 304 modify attributes other than the coordinates.

In one or more implementations, the vertex shader(s) 304 is implemented partially or fully as vertex shader programs to be executed on one or more compute units 208. The vertex shader programs are provided by the processor 102 and are based on programs that are pre-written by a computer programmer. The kernel mode driver 204 compiles such computer programs to generate the vertex shader programs having a format suitable for execution within the compute units 208. Some implementations of shaders such as the vertex shader 304 implement massive single-instruction-multiple-data (SIMD) processing so that multiple vertices are processed concurrently. In at least some implementations, the graphics pipeline 214 implements a unified shader model so that all the shaders included in the graphics pipeline 214 have the same execution platform on the shared massive SIMD compute units 210. In these implementations, the shaders, including the vertex shader(s) 304, are implemented using a common set of resources that is referred to herein as the unified shader pool 306.

The vertex processing stage 303, in one or more implementations, also performs additional vertex processing computations, which subdivide primitives and generates new vertices and new geometries in world space. In at least some implementations, these additional vertex processing computations are performed by one or more of a hull shader 308, a tessellator 310, a domain shader 312, and a geometry shader 314. The hull shader 308 operates on input high-order patches or control points that are used to define the input patches. The hull shader 308 outputs tessellation factors and other patch data. In one or more implementations, primitives generated by the hull shader 308 are provided to the tessellator 310. The tessellator 310 receives objects (such as patches) from the hull shader 308 and generates information identifying primitives corresponding to the input object, e.g., by tessellating the input objects based on tessellation factors provided to the tessellator 310 by the hull shader 308. Tessellation subdivides input higher-order primitives such as patches into a set of lower-order output primitives that represent finer levels of detail, e.g., as indicated by tessellation factors that specify the granularity of the primitives produced by the tessellation process. A model of a scene is therefore represented by a smaller number of higher-order primitives (to save memory or bandwidth) and additional details are added by tessellating the higher-order primitive.

The domain shader 312 inputs a domain location and (optionally) other patch data. The domain shader 312 operates on the provided information and generates a single vertex for output based on the input domain location and other information. The geometry shader 314 receives an input primitive and outputs up to four primitives that are generated by the geometry shader 314 based on the input primitive. In some implementations, the geometry shader 314 retrieves vertex data from storage resources 334 and generates new graphics primitives, such as lines and triangles, from the vertex data in storage resources 334. In particular, the shader 314 retrieves vertex data for a primitive, as a whole, and generates zero or more primitives. For example, the geometry shader 314 can operate on a triangle primitive with three vertices. A variety of different types of operations can be performed by the geometry shader 314, including operations such as point sprint expansion, dynamic particle system operations, fur-fin generation, shadow volume generation, single pass render-to-cubemap, per-primitive material swapping, and per-primitive material setup. In at least some implementations, one or more of the hull shader 308, the domain shader 312, or the geometry shader 314 are implemented as shader programs to be executed on the programmable processing units, such as the SIMD units 210, whereas the tessellator 310 is implemented by fixed function hardware.

Once front-end processing is complete, the scene is defined by a set of vertices which each have a set of vertex parameter values stored in the storage resources 334. In certain implementations, the vertex parameter values output from the vertex processing stage 303 include positions defined with different homogeneous coordinates for different zones.

As described above, stages 305 to 311 represent the back-end processing of the graphics processing pipeline 214. The rasterizer stage 305 includes a rasterizer 316 that accepts and rasterizes simple primitives and generated upstream. The rasterizer 316 performs shading operations and other operations such as clipping, perspective dividing, scissoring, and viewport selection, and the like. The rasterizer 316 generates a set of pixels that are subsequently processed in the pixel processing/shader stage 307 of the graphics pipeline 214. In some implementations, the set of pixels includes one or more tiles. In one or more implementations, the rasterizer 316 is implemented by fixed function hardware.

The pixel processing stage 307 includes one or more pixel shaders 318 that input a pixel flow (e.g., including the set of pixels generated by the rasterizer 316) and outputs zero or another pixel flow in response to the input pixel flow. A pixel shader 318 calculates output values for screen pixels based on the primitives generated upstream and the results of rasterization. In one or more implementations, the pixel shader 318 applies textures from texture memory, which can be implemented as part of the storage resources 334. The output(s) generated by the one or more pixel shaders 318, such as color values, depth values, and stencil values are stored in one or more corresponding buffers, such as a color buffer 320, a depth buffer 322, and a stencil buffer 324, respectively. The combination of the color buffer 320, the depth buffer 322, and, optionally, the stencil buffer 324 is referred to as a frame buffer 326. In at least some implementations, the graphics pipeline 214 implements multiple frame buffers 326 including front buffers, back buffers and intermediate buffers such as render targets, frame buffer objects, and the like. Operations for the pixel shader 318 are performed by a shader program that executes on the programmable processing units 210.

In one or more implementations the pixel shader 318, or another shader, accesses shader data, such as texture data, stored in the storage resources 334. Texture data defines textures, which are bitmap images used at various points in the graphics processing pipeline 214. For example, in some instances, the pixel shader 318 applies textures to pixels to improve apparent rendering complexity (e.g., to provide a more "photorealistic" look) without increasing the number of vertices to be rendered. In another instance, the vertex shader 304 uses texture data to modify primitives to increase complexity, by, for example, creating or modifying vertices for improved aesthetics. For example, the vertex shader stage 304 uses a height map stored in storage resources 334 to modify displacement of vertices. This type of technique can be used, for example, to generate more realistic looking water as compared with textures only being used in the pixel processing stage 307, by modifying the position and number of vertices used to render the water. The geometry shader 314, in some instances, also accesses texture data from the storage resources 334.

An output merger stage 309, includes an output merger 328 that accepts output from the pixel processing stage 307 and merges those outputs, performing operations such as z-testing, alpha blending, stenciling, or other operations on each pixel received from the pixel shader 318 to determine the final color for a screen pixel. For example, the output merger 328 combines various types of output data (e.g., pixel shader values, depth and stencil information, etc.) with the contents of the color buffer 320, depth buffer 322, and, optionally, the stencil buffer 324 and stores the combined output back into the frame buffer 326. The output of the merger stage 309 can be referred to as rendered pixels that collectively form a rendered frame. In one or more implementations, the output merger 328 is implemented by fixed function hardware.

A post-processing stage 311 is implemented after the output merger stage 309. In the post-processing stage, 311 one or more post-processors 330 operate on the rendered frame stored (or individual pixels) stored in the frame buffer 326 to apply one or more post-processing effects, such as ambient occlusion or tonemapping, prior to the frame being output to the display. In at least some implementations, the post-processors 330 are implemented using one or more vertex shaders 304, one or more pixel shaders 318, or the like. The post-processed frame is written to a frame buffer 326, such as a back buffer for display or an intermediate buffer for further post-processing. The graphics pipeline 214, in at least some implementations, includes other shaders or components, such as a computer shader 340, a ray tracer 342, a mesh shader 344, and the like, which can communicate with one or more of the other components of the graphic pipeline 214. The vertex processing stage 303, the rasterizer stage 305, the pixel processing stage 307, and at least a portion of the post-processing stage 311 are collectively referred to herein as a "renderer 313" or a "rendering stage 313" of the graphics pipeline 214.

In many instances, the amount of processing resources necessary for rendering full, high-resolution images can make it difficult to render frames while meeting current frame rates, such as at least sixty frames per second (fps). As such, in one or more implementations, the application 206 (e.g., a video game) uses the renderer 313 to generate a rendered image at a render resolution or size (e.g., 1920× 1080 pixels) that is lower than one or more final output/ presentation resolutions or sizes (e.g., 3840×2160 pixels) to meet timing requirements and reduce processing resource requirements. In at least some implementations, a super resolution upscaling stage 315, which includes a super resolution upscaler 332 (referred to herein as "upscaler 332" for brevity), processes the low-resolution rendered image to generate an upscaled image that represents content of the low-resolution rendered image at a resolution that equals (or is at least closer to) a target presentation resolution. The upscaling stage 315, in one or more implementations, is implemented as part of the post-processing stage 311. However, in other implementations, the upscaler 332 is part of a different processing stage of the graphics pipeline 214. In one or more implementations, the upscaler 332 is implemented using one or more vertex shaders 304, pixel shaders 318, compute shaders 340, the like, or a combination thereof.

The upscaler 332 improves application rendering performance by implementing a temporal upscaling algorithm that operates on a number of inputs. Therefore, in one or more implementations, the upscaler 332 is positioned in the graphics pipeline 214 at a location that ensures a balance between the highest quality visual quality and performance. Placing other image-space processes before an upscaler has the advantage that these other image-space processes run at a lower resolution, which confers a performance advantage onto the application 206. However, this placement may not be appropriate for some classes of image-space processes/ techniques. For example, some image-space processes may introduce noise or grain into the final image (e.g., to simulate a physical camera). Placing these image-space processes before an upscaler can cause the upscaler to amplify the noise, which causes undesirable artifacts in the resulting upscaled image. As such, in one or more implementations, the upscaler 332 is placed between post-processors 330 that typically operate on the current frame at the render resolution and post-processors 330 that operate on the upscaled frame generated by the upscaler 332 at the presentation resolution. However, in at least some implementations, techniques, such as noise and grain, are able to be computed in low-resolution and applied/composited to the upscaled frame using, for example, bilinear sampling.

Figure 4:
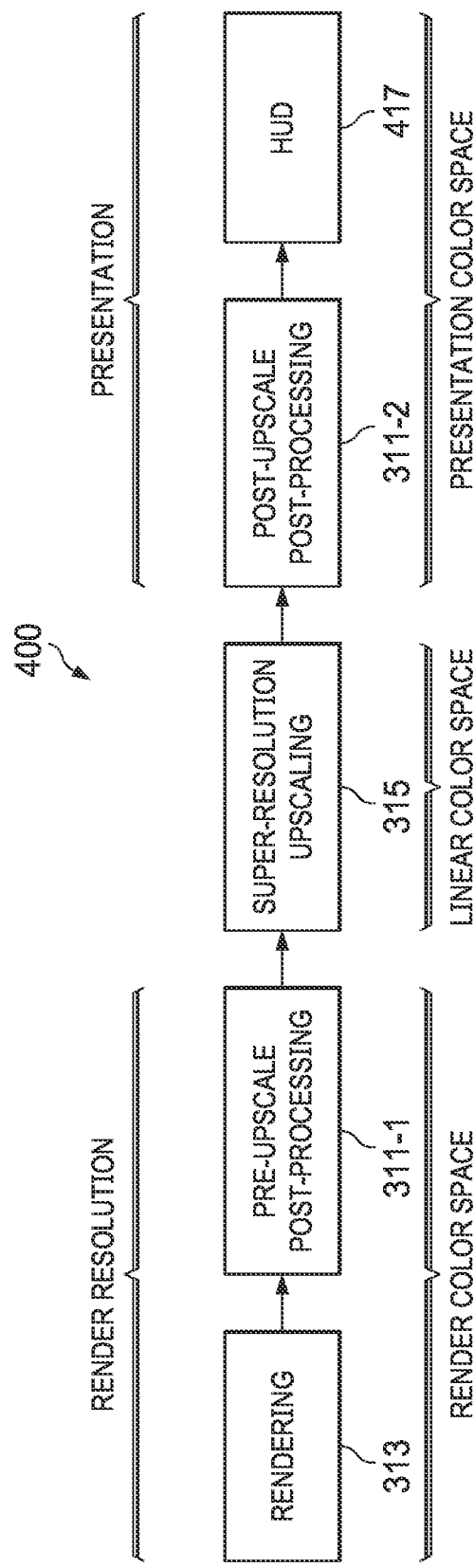
FIG. 4 illustrates a graphics pipeline integration diagram for a super resolution upscaler in accordance with some implementations.

FIG. 4 illustrates a graphics pipeline integration diagram 400 for the upscaler 332. In this example, the first stage is the rendering portion 313 of the graphics pipeline 214 that renders a current frame at a given render resolution in a render color space. A pre-upscale post-processing stage 311-1 takes the rendered frame as input and performs one or more post-processing operations on the rendered frame at the render resolution and in the render color space. The pre-upscale post-processing stage 311-1 includes post-processors 330 that perform post-processing operations that typically access the depth buffer 322 of the rendered frame. Examples of these post-processing operations include screen space reflections, screen space ambient occlusion, denoising (e.g., shadow or reflections), exposure, and the like. The upscaling stage 315 takes the output of the pre-upscale post-processing stage 311-1 (or the rendering stage 313) as input and performs at least one of upscaling or anti-aliasing operations on the pre-scale post-processed frame or rendered frame (if post-processing has not been performed) in linear color space. The output of the upscaling stage 315 is at least one of an upscaled or anti-aliased frame having the target presentation resolution in the presentation color space. A post-upscale post-processing stage 311-2 takes the upscaled (and anti-aliased) frame as input and performs one or more post-processing operations on the upscaled frame at the presentation resolution and in the presentation color space. The post-upscale post-processing stage 311-2 includes post-processors 330 that perform operations that typically use an anti-aliased frame or that add effects to the frame that would introduce undesirable artifacts when the frame is upscaled. Examples of these post-processing operations include film grain, chromatic aberration, vignette, tonemapping, blooming, depth-of-field, motion blur, and the like. The last stage 417 in the example shown in FIG. 4 is the presentation of the user interface or heads-up-display, which the graphics pipeline 214 renders at the presentation resolution and in the presentation color space.

Figure 5:
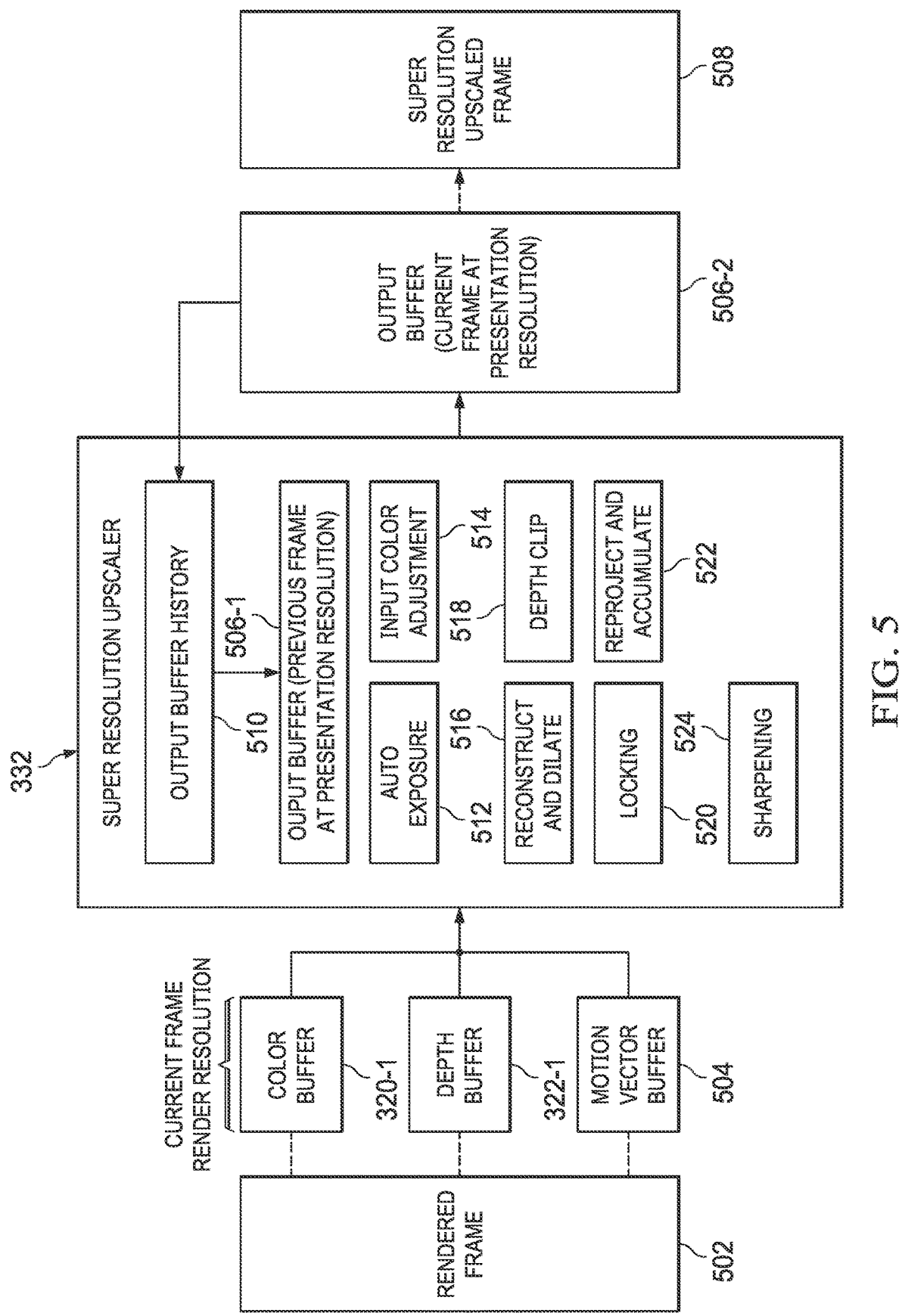
FIG. 5 is a block diagram illustrating a more detailed view of the super resolution upscaler of FIG. 4 in accordance with some implementations.

FIG. 5 is a block diagram illustrating a more detailed view of the upscaler 332. As described below, the upscaler 332 is temporal and takes data associated with a currently rendered (aliased) frame 502 (also referred to herein as "current frame 502" or "input frame 502") and data associated with a previously presented (upscaled) frame as input. In one or more implementations, the rendered frame 502 and the previously upscaled frame are frames of a video stream. The previously presented frame is the most recent frame processed by the upscaler 332 and presented to the user at the target presentation resolution. In one or more implementations, the input data associated with the previously presented frame includes an output buffer 506-1 that maintains data, such as a color buffer (e.g., output color), a depth buffer, and the like, for the previously presented frame. The resolution/size of the output buffer 506-1 corresponds to the presentation resolution.

In one or more implementations, the input data associated with the current frame 502 includes various buffers provided by the application 206, such as a color buffer 320-1, a depth buffer 322-1, and a motion vector buffer 504. The input color buffer 320-1 is the render resolution color buffer for the current frame 502 provided by the application 206. In one or more implementations, the input color buffer 320-1 includes color data, such as pixel color values, that is generated based on sub-pixel jittering performed during rendering of the current frame 502. Sub-pixel jittering can be performed for each frame in a sequence of frames during the rendering stages. During sub-pixel jittering, a center point of a color determination for a pixel of the frame is shifted slightly to another point in the pixel using a sub-pixel offset and the color data is determined for this offset location. In one or more implementations, the output merger 328 of the graphics pipeline 214 combines the multi-sampled color data determined for each sub-pixel sample to determine the final color data for the corresponding pixel. The output merger 328 then stores the final color data into the color buffer 320-1 of the frame 502. The jitter locations, in one or more implementations, are determined randomly or according to a determined pattern or sequence, such as a Halton sequence (e.g., Halton[2,3]). A Halton sequence provides spatially separated points that cover the available pixel space. In one or more implementations, jitter is applied to the rendering of multiple object types including opaque, alpha transparent, and raytraced objects. For rasterized objects, the sub-pixel jittering values can be applied to the camera projection matrix, which is subsequently used to perform transformations during vertex shading. For raytraced rendering, the sub-pixel jitter is applied to the origin of the ray origin, which is often the position of the camera.

In some configurations, the input depth buffer 322-1 includes a stencil buffer 324. However, in other configurations, the input depth buffer 322-1 is stored separately from the stencil buffer 324. The input depth buffer 322-1 is the render resolution depth buffer for the current frame 502 provided by the application 206. In one or more implementations, the resolution/size of the input color buffer 320-1 and the input depth buffer 322-1 is equal to the render resolution. The motion vector buffer 504 includes the 2D motion vectors that encode the motion from a pixel in the current frame 502 to the position of that same pixel in the previous (upscaled) frame. In one or more implementations, the motion vectors are provided by the application 206 in, for example, [(<−width, −height> . . . <width, height>)] range. For example, a motion vector for a pixel in the upper-left corner of the screen with a value of <width, height> represents a motion that traversed the full width and height of the input surfaces, originating from the bottom-right corner of the screen. In at least some configurations, one or more of opaque, alpha-tested, or alpha-blended objects write their motion vectors for all covered pixels. If vertex shader effects are applied, such as scrolling UVs, these calculations are factored into the calculation of motion for the enhanced results. In some configurations, the resolution/size of the motion vector buffer 504 is equal to the render resolution. However, in other configurations, the resolution/size of the motion vector buffer 504 is equal to the presentation resolution. In one or more implementations, the color buffer 320-1, the depth buffer 322-1, and the motion vector buffer 504, are texture data types, although other data types are applicable as well.

In at least some implementations, the upscaler 332 processes additional external input resources, such as a reactivity mask 602 (FIG. 6) and an exposure 604 (FIG. 6) of the rendered frame 502, when upscaling the rendered frame 502. In the context of the upscaler 332, "reactivity" refers to how much influence the samples rendered for the current frame 502 have over the production of the final upscaled image. In one or more implementations, samples rendered for the current frame 502 contribute a relatively modest amount to the result computed by the upscaler 332, with exceptions. For example, to produce the best results for fast moving alpha-blended objects, one or more stages (e.g., the reproject and accumulate stage 611 (FIG. 6)), of the upscaler 332 are configurable to become more reactive for such pixels. As it may be difficult to determine from either color, depth, or motion vectors which pixels have been rendered using alpha blending, the application 206, in one or more implementations, provides a reactivity mask 602 as an input to the upscaler 332. The reactivity mask 602 provides a mechanism for the application 206 to identify areas of the rendered frame 502 that do not leave a footprint in the input depth buffer 322-1 or include motion vectors 504. Stated differently, the reactivity mask 602 guides the upscaler 332 on where it should reduce its reliance on historical information when compositing the current pixel and, instead, allow the samples of the current frame 502 to contribute more to the final result. The reactivity mask 602 allows the application 206 to provide a value from, for example, [0 . . . 1], where a value of 0 indicates that the pixel is not at all reactive (e.g., the upscaler 332 is to use its default composition strategy), and a value of 1 indicates the pixel is fully reactive. In one or more implementations, the alpha value used when compositing an alpha-blended object (e.g., particles) into the scene is implemented as a proxy for reactiveness. In these implementations, an application 206 writes the alpha value of each covered pixel for an alpha-blended object to the corresponding pixel in the reactivity mask 602. The resolution/size of the reactivity mask 602, in one or more implementations, is equal to the render resolution of the render resolution. Also, in one or more implementations, the reactivity mask 602 is a texture data type, although other data types are applicable as well.

The exposure 604 informs the upscaler 332 of the exposure value computed by the application 206 for the rendered frame 502. The exposure value, in one or more implementations, matches the exposure used by the application 206 during any subsequent tonemapping passes. In at least some implementations, the upscaler 332, at various stages, computes its own exposure value for internal use. Also, in one or more implementations, the outputs generated by the upscaler 332 have this internal tonemapping reversed before the final output is written. In other words, the upscaler 332 returns results in the same domain (or close to the same domain) as the original input signal. The exposure 604, in one or more implementations, is a texture data type, although other data types are applicable as well.

The upscaler 332 uses the current frame input and the previous frame input to generate a super resolution upscaled (and anti-aliased) frame 508 (also referred to herein as "upscaled frame 508" for brevity), which corresponds to the rendered frame 502, at the target presentation resolution. In one or more implementations, the upscaler 332 stores the data representing the upscaled frame 508 in an output buffer 506-2. The upscaler 332 maintains an output buffer history 510 for accessing output buffers 506-1 generated for previously presented frames. The upscaler 332 implements one or more components to perform the upscaling and antialiasing operations described herein. For example, the upscaler 332 implements an auto-exposure component 512, an input color adjustment component 514, a reconstruct and dilate component 516, a depth clip component 518, a locking component 520, a reproject and accumulate component 522, and a sharpening component 524. Each of these components is implemented in a corresponding stage of the upscaler 332 as described below with respect to FIG. 6. It is understood that although the components 512 to 524 of the upscaler 332 are illustrated as being implemented separate from each other, two of more of these components can be combined.

Figure 6:
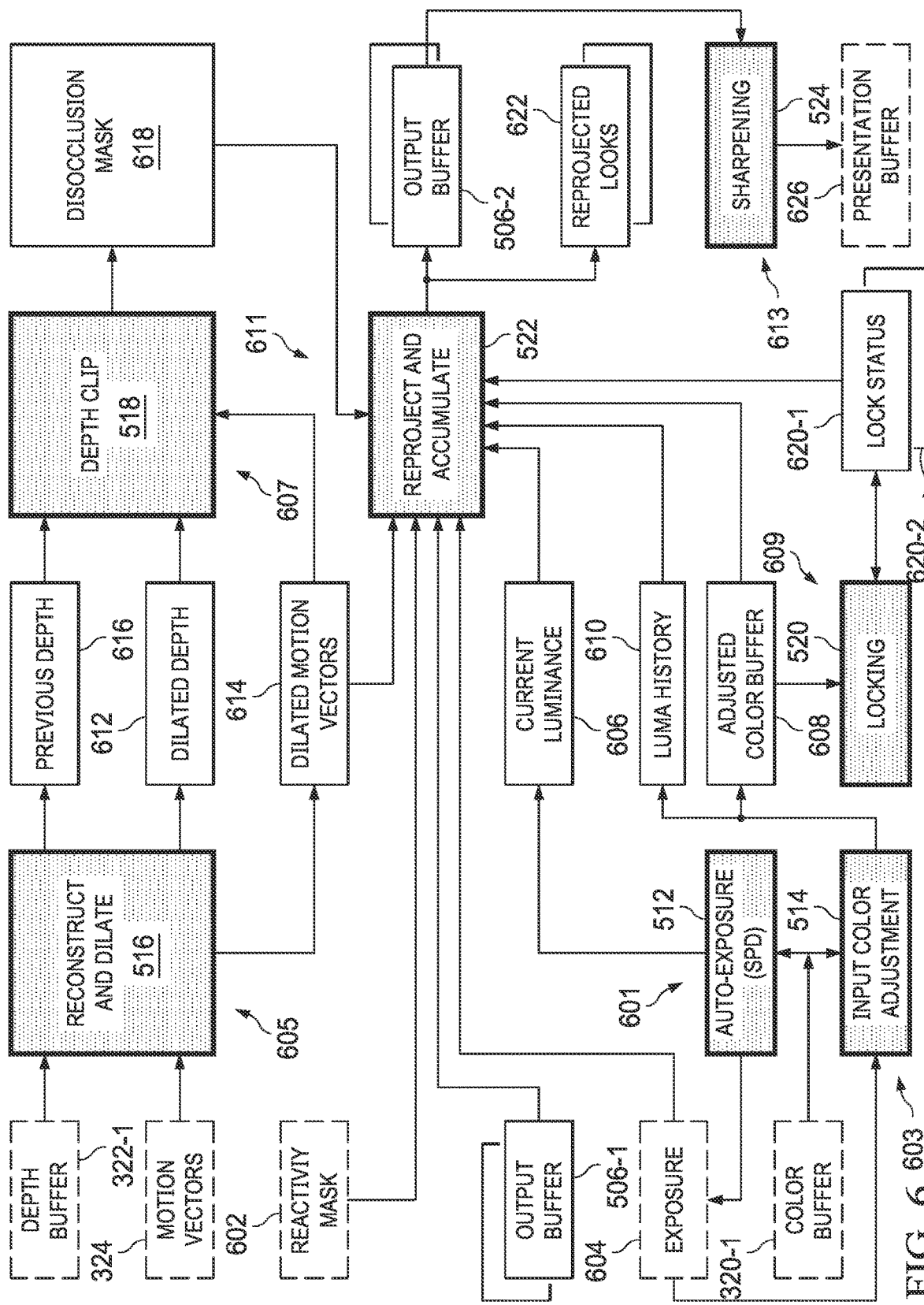
FIG. 6 is a block diagram illustrating the various stages/passes of the super resolution upscaler of FIG. 5 in accordance with some implementations.

FIG. 6 illustrates the various stages/passes of the upscaler 332, such as an auto-exposure stage 601, an input color adjustment stage 603, a reconstruct and dilate stage 605, a depth clip stage 607, a locking stage 609, a reproject and accumulate stage 611, and a sharpening stage 613. FIG. 6 further illustrates the inputs processed by each stage and the outputs generated by each stage. In the example shown in FIG. 6, the shaded boxes represent stages of the upscaler 332, the dashed boxes represent input/output buffers, and the solid boxes represent intermediate/working buffers. In one or more implementations, an application 206 interacts with the upscaler 332 through one of a plurality of different application programming interfaces (APIs). For example, the application 206 can instantiate the upscaler 332, issue one or more calls to the upscaler 332, pass one or more data structures and inputs to the upscaler 332, or the like through the API. In one or more implementations, when the upscaler 332 is instantiated (e.g., called by the application 206), storage resources 334, such as GPU local memory, are allocated for consumption by the upscaler 332. The upscaler 332 uses these storage resources 334 to store intermediate textures that are computed by the upscaler 332 and to also store textures that are persistent across many frames of the application 206.

In the auto-exposure stage 601, the application 206 provides the color buffer 320-1 of the currently rendered frame 502 to the auto-exposure component 512 as input. If the contents of the color buffer 320-1 are in high dynamic range (HDR), the application 206 can indicate this to the auto-exposure component 512 by, for example, setting a flag in a data structure provided to the upscaler 332 by the application 206. The auto-exposure component 512 processes the color buffer 320-1 to produce up to two intermediate storage resources depending on a configuration provided by the application 206. The first intermediate storage resource is a current luminance texture 606, which is a lower-resolution representation of the input color's luminance. For example, the current luminance texture 606 is a texture at 50% (or other percentage) of the render resolution texture (e.g., the color buffer 320-1) that includes the luminance value of the currently rendered frame 502. As described below, the current luminance texture 606 is used by a shading change detection process in the reproject and accumulation stage 611. The second intermediate storage resource is the exposure texture 604 that includes the exposure value computed for the rendered frame 502. The exposure texture 604 which is optionally used by subsequent stages of the upscaler 332 depending on a configuration of the upscaler 332. For example, the application 206 can indicate whether the exposure 604 is to be used during the upscaling process by, for example, setting a flag in a data structure provided to the upscaler 332. In other implementations, the exposure 604 is provided to the auto-exposure component 512 as an input by the application 206. The exposure 604 is optionally used by the exposure calculations of the input color adjustment stage 603 to apply tonemapping and is used by the reproject and accumulate stage 611 for reversing local tonemapping ahead of producing an output (e.g., upscaled frame 508) by the upscaler 332. The exposure 604, in one or more implementations, has a resolution/size of 1×1 pixels, although other sizes are applicable as well.

In at least some implementations, the auto-exposure component 512 implements at least one downsampling mechanism, such as the AMD FidelityFX® Single Pass Downsampler, that produces mipmap chains using a shader dispatch, such as a single compute shader dispatch. A mipmap is a collection of bitmap images of a texture with successively reduced resolutions. In other words, the mipmap includes multiple versions of the same texture, with each version at a different resolution. These different versions can be referred to as "mipmap levels", "levels", or "mips". In one or more implementations, instead of the conventional pyramidal approach, the downsampling mechanism implemented by the auto-exposure component 512 produces a specific set of mipmap levels for an arbitrary input texture (e.g., the input color buffer 320-1), as well as performing arbitrary calculations on that data as the data is stored to the target location in memory.

Figure 7:
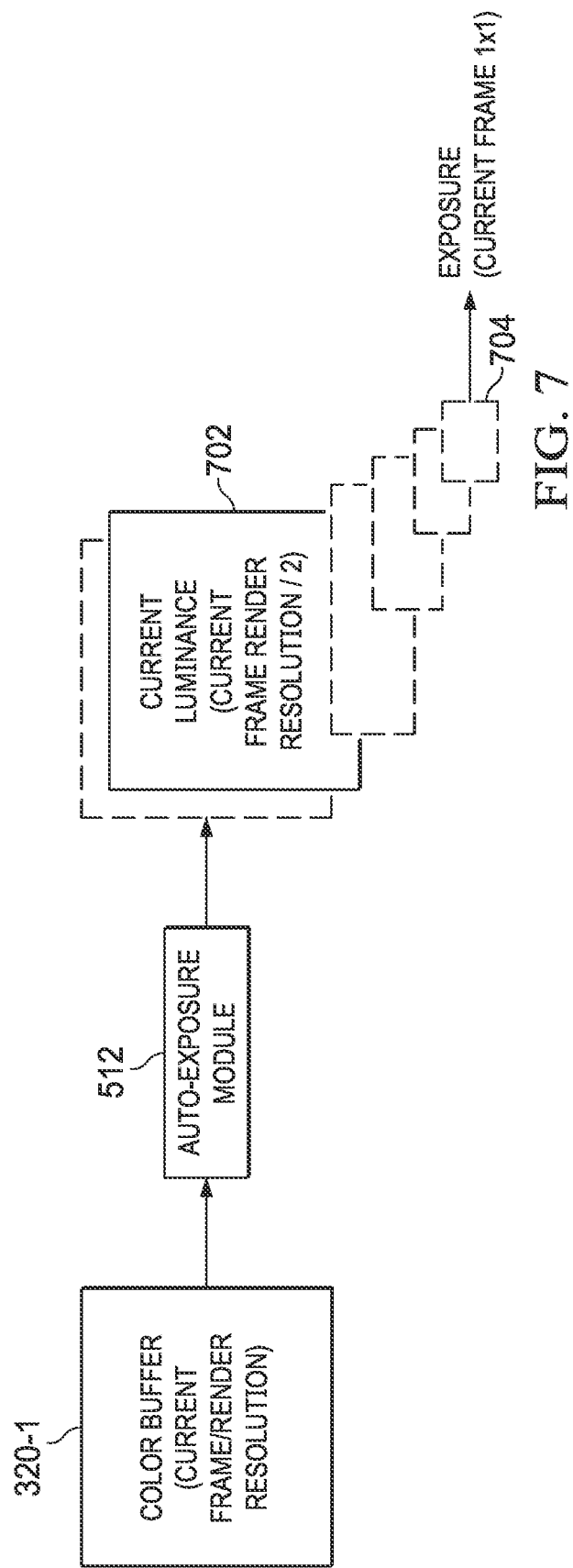
FIG. 7 is a diagram illustrating a downsampling technique of an auto-exposure component of the of the super resolution upscaler of FIG. 5 in accordance with some implementations.

The downsampling mechanism of the auto-exposure component 512, in one or more implementations, is configured to write only to the second (e.g., half resolution) mipmap level 702 and the last (1×1) mipmap level 704, as illustrated in FIG. 7. Moreover, different calculations are applied at each of these levels 702 and 704 to calculate the quantities used by subsequent stages of the upscaler 332. As such, the remaining levels of the mipmap chain do not need to be backed by GPU local memory (or any other type of memory). The second mipmap level 702 includes the current luminance 606 and the last mipmap level 704 includes the exposure 604, the values of which are computed during the downsampling of the color buffer 320-1. In one example, the current luminance 606 includes a texture at $\frac{1}{32}^{nd}$ render resolution such that each pixel includes the average luminance of a 32×32 pixel area in the source texture. By sampling into the texture using the coordinates of the current pixel and using a bilinear sample, the average luminance of a 32×32 pixel region around the input pixel is obtained.

Returning to FIG. 6, various stages of the upscaler 332, in one or more implementations, operate in a different color space, such as YCoCg, than the rendered frame 502 (e.g., RGBa). Therefore, to avoid repeatedly calculating conversions from the color space used by the application 206, the upscaler 332 implements the input color adjustment stage 603, which applies all adjustments to the color once. For example, in the input color adjustment stage 603, the input color adjustment component 514 takes as input the input color buffer 320-1 provided by the application 206 and the exposure 604 provided either by the application 206 or generated by the auto-exposure component 512 in the auto-exposure stage 601. The input color adjustment component 514 processes these inputs to perform various adjustment operations on the input colors of the rendered frame 502. One example of these adjustment operations include dividing the input color (e.g., RGB) by a pre-exposure value, which is provided by the application 206 as part of the current frame 502, to obtain an original input color. In many instances, different frames use different pre-exposure values (to help computation precision from the game perspective) and the original input color of a frame is divided by the pre-exposure value to get all images in a comparable range space. Another example of the adjustment operations includes aligning the input image to a mid-gray level by multiplying the input color by the exposure value 604. A further example of the adjustment operations includes converting the exposed color to the YCoCg color space. The YCoCg color space includes a luma value (Y) and two chroma values, chrominance green (Cg) and chrominance orange (Co). The luma value (Y) represents the brightness in the rendered frame 502 (the achromatic portion of the frame) and the chroma components (Co and Cg) represent the color information of the rendered frame 502. The results of the input color adjustment stage 603 are then cached to an adjusted color buffer (texture) 608, which subsequent stages of the upscaler 332 can then read. In one or more implementations, the resolution/size of the adjusted color buffer 608 is equal to the render resolution.

As part of the adjustment process, the input color adjustment component 514 also generates a luminance history buffer (texture) 610 having a resolution/size equal to the render resolution. The luminance history buffer 610 includes the luma value Y of the current prepared input color of the rendered frame 502. In one or more implementations, the luminance history buffer 610 is persistent (i.e., it is not available for aliasing or cleared each frame). As such, multiple frames (e.g., four frames) of luminance history are maintained in the luminance history buffer 610 and are accessible during input color adjustment stage 603 for any one frame. However, at the end of the input color adjustment stage 603, the luminance history values are shifted down. In other words, in at least some implementations, subsequent stages of the upscaler 332 have access to a lower number of luminance frames, e.g., the three most recent frames of luminance (the current frame, and the two previous frames). Therefore, in this example, if the current frame is denoted as n, then the values stored in the luminance history buffer 610 are as follows:

TABLE 1

| Channel | Frame Index (Start Of Adjustment Input Color Stage) | Frame Index (End Of Input color adjustment stage) |
|---------|------------------------------------------------------|---------------------------------------------------|
| Red     | n − 1                                                | n                                                 |
| Green   | n − 2                                                | n − 1                                             |
| Blue    | n − 3                                                | n − 2                                             |

In one or more implementations, the input color adjustment component 514 encodes a stability factor into the alpha channel of the luminance history buffer 610. The stability factor is a measure of the stability of the luminance over the current frame 502 and a given number of frames (e.g., three frames) that came before the current frame 502.

In addition to performing the input color adjust operations described above, the input color adjustment component 514 clears a reprojected/previous depth buffer 616, which is described below, to a known value. This process prepares the previous depth buffer 616 for the reconstruct and dilate stage 605 on the next rendered frame of the application 206. The input color adjustment component 514 selects the clearing value based on, for example, the configuration of the previous depth buffer 616. For example, the input color adjustment component 514 clears the previous depth buffer 616 to the maximum z-far value, which is typically 0 for inverted depth. In at least some configurations, the previous depth buffer 616 is cleared as a result of the reconstruct and dilate stage 605 populating the previous depth buffer 616 using atomic operations.

In the reconstruct and dilate stage 605, the reconstruct and dilate component 516 takes the input depth buffer 322-1 and the motion vector buffer 504 provided by the application 206 as input. The reconstruct and dilate component 516 processes this input to produce a dilated depth buffer 612 for the previous frame, a buffer 614 including a dilated set of motion vectors in UV space, and the reprojected/previous depth buffer 616. In one or more implementations, the reconstruct and dilate component 516 applies motion vector scaling to transform non-screen-space motion vectors into screen space motion vectors prior to processing the motion vectors. The dilated depth buffer 612 is a texture including dilated depth values determined from the input depth buffer 322-1. The dilated motion vector buffer 614 is a texture including dilated 2D motion vectors determined from the input motion vector buffer 504. In one or more implementations, a first color channel, such as the red channel, and a second color channel, such as the green channel, of the dilated motion vector buffer 614 includes the 2D motion vectors in normalized device coordinate (NDC) space. The previous depth buffer 616 is a texture including reconstructed previous frame depth values. Each of these buffers has a resolution/size equal to the render resolution of the current frame 502.

Figure 8:
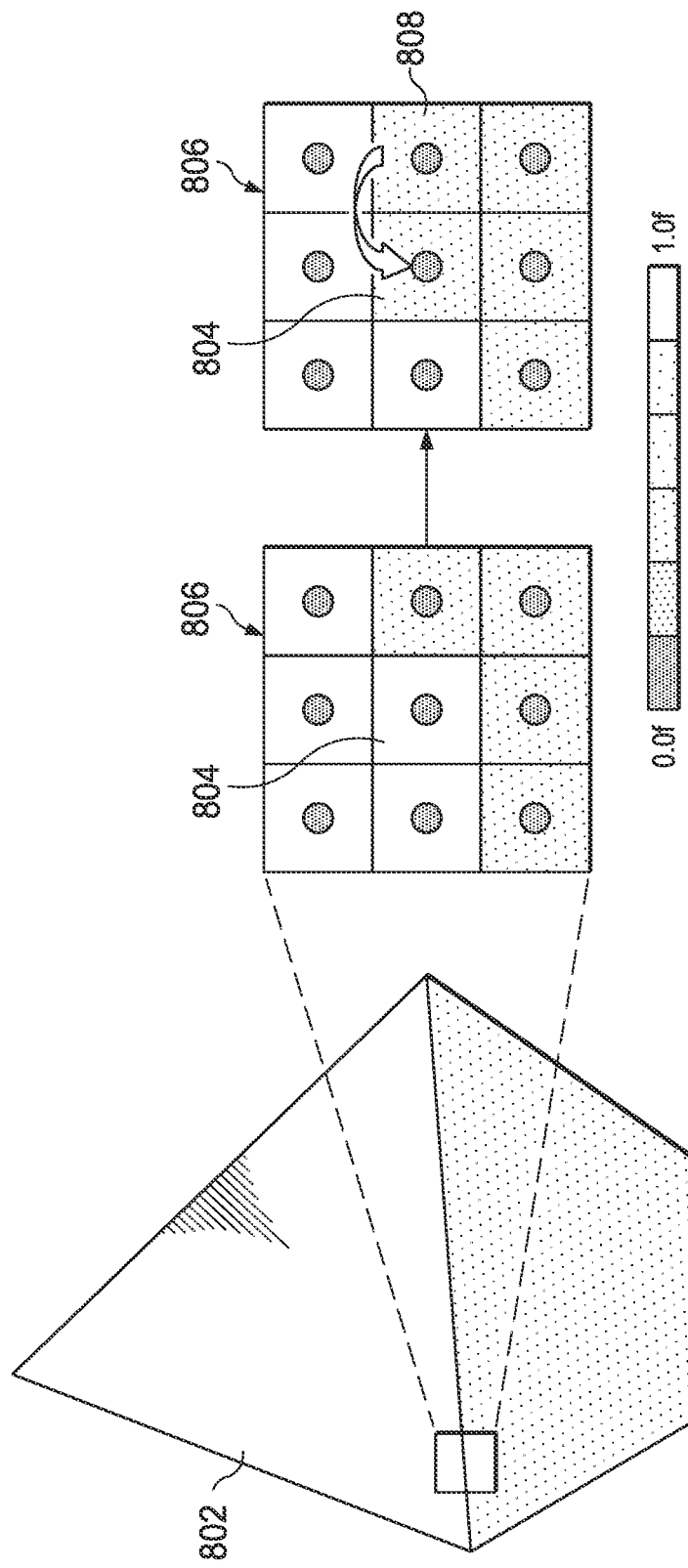
FIG. 8 is a diagram illustrating an example of a dilated depth value and motion vector construction process performed by reconstruct and dilate component of the of the super resolution upscaler of FIG. 5 in accordance with some implementations.

In more detail, the reconstruct and dilate component 516 computes the dilated depth values and motion vectors from the input depth values and motion vectors, which are respectively included in the input depth buffer 322-1 and the input motion vector buffer 504 for the current frame 502. Dilated depth values and motion vectors emphasize the edges of geometry that has been rendered into the input depth buffer 322-1. For example, the edges of geometry often introduce discontinuities into a contiguous series of depth values. Therefore, as the depth values and motion vectors are dilated, they naturally follow the contours of the geometric edges present in the input depth buffer 322-1. In one or more implementations, the reconstruct and dilate component 516 computes the dilated depth values and motion vectors by considering the depth values of a 3×3 (or other kernel size) neighborhood for each pixel of the current frame 502. The reconstruct and dilate component 516 then selects the depth values and corresponding motion vectors in that neighborhood where the depth value is nearest to the camera. This process is illustrated in FIG. 8, which shows one example of a geometry 802 of the current frame 502 in which the central pixel 804 of the 3×3 kernel 806 is updated with the depth value and motion vectors from the pixel 808 with the largest depth value. The reconstruct and dilate component 516 stores the determined dilated depth values in the dilated depth buffer 612 and stores the determined dilated motion vectors in the dilated motion vector buffer 614.

The reconstruct and dilate component 516 uses the dilated motion vectors of the dilated motion vector buffer 614 to estimate the position of each pixel from the current frame's depth buffer 322-1 in the previous frame. For example, the reconstruct and dilate component 516 applies the dilated motion vector computed for a pixel to its value in the dilated depth buffer 612 to determine the location of the pixel in the previous frame. Stated differently, each depth sample from the dilated depth buffer 612 is reprojected to its location in the previous frame using the dilated motion vector of the sample. The reprojected depth sample is scattered among impacted depth samples using, for example, backward or reverse reprojection. As it is possible for many pixels to reproject into the same pixel of the previous frame, the reconstruct and dilate component 516 uses atomic operations to resolve the value of the nearest depth value for each pixel. For example, in one or more implementations, the reconstruct and dilate component 516 uses atomic operations such InterlockedMax or InterlockedMin provided by the High-Level Shader Language (HLSL) or comparable equivalents. In some implementations, the reconstruct and dilate component 516 performs different atomic operations (e.g., InterlockedMax or InterlockedMin) depending on whether the input depth buffer 322-1 is inverted or non-inverted. The reconstruct and dilate component 516 stores the reconstructed/estimated depth values in the reconstructed/previous depth buffer 616.

Returning to FIG. 6, in the depth clip stage 607, the depth clip component 518 takes the dilated depth buffer 612, the dilated motion vector buffer 614, and the previous depth buffer 616 as input. The depth clip component 518 processes this input to produce a disocclusion mask/map 618 indicating disoccluded areas of the current rendered frame 502. For example, as the camera moves from an initial position (previous frame) to a new position (current frame), a pixel that was initially occluded from the viewpoint of the camera's previous position can become visible (disoccluded) from the viewpoint of the camera's current position. In one or more implementations, the disocclusion mask 618 is a texture including a value indicating how much a corresponding pixel of the current frame 502 has been disoccluded. In one example, a value of 0 indicates that the pixel was entirely occluded in the previous frame and is now disoccluded, and a value of 1 indicates the pixel was fully visible in the previous frame and is fully visible in the current frame 502. Values between 0 and 1 indicate that the pixel was visible in the previous frame to an extent proportional to the value. The disocclusion mask 618, in one or more implementations, has a resolution/size equal to the render resolution.

The depth clip component 518 generates the disocclusion mask 618 by, for example, computing the depth value for each pixel from the previous camera's position and the new camera's position. The depth clip component 518 compares the delta between the depth values against a separation value, such as the Akeley separation constant $k_{sep}$. The Akeley separation constant provides a minimum distance between two objects represented in a floating point depth buffer, which the depth clip component 518 uses to determine, with a high degree of certainty, that the pixels were originally distinct from one another. In one or more implementations, if the depth clip component 518 determines that the delta between the depth values is larger than the separation value, which has been computed for the application's depth buffer 612 configuration, the depth clip component 518 determines the pixels represent distinct objects. However, if the depth clip component 518 determines that the delta between the depth values does not exceed the separation value, the depth clip component 518 is unable to confidently determine that the pixels represent distinct objects. The depth clip component 518 stores a value in the disocclusion mask 618 for the pixel in the range of, for example, [0 . . . 1], with a value of 1 mapping to a delta that is greater than or equal to the separation value.

In the locking stage 609 of the upscaler 332, the locking component 520 creates new pixel locks based on pixels of the current frame 502. As described below, the pixel locks are consumed in the reproject and accumulate stage 611 of the upscaler 332. The locking component 520 takes input lock status information 620, such as an input lock status texture/buffer 620-1 (also referred to herein as "lock status 620-1" for brevity), and the adjusted color buffer 608 as input. Based on this input, the locking component 520 generates a lock for one or more pixels of the current frame 502 if applicable. In one or more implementations, the generated lock is stored in an output lock status texture/buffer 620-2 (also referred to herein as "lock status 620-2" for brevity). In one or more implementations, the upscaler 332 maintains lock status 620 as array of two textures, i.e., the input lock status 620-1 and the output lock status 620-2. The input lock status 620-1 is a lock status texture that is used as input by the upscaler 332 when processing the current frame 502 and was generated for the previously upscaled frame. The output lock status 620-2 is a lock status texture generated for the current frame 502 that is used as input for the next frame to be processed by the upscaler 332. The input lock status 620-1 and the output lock status 620-2 each have a resolution/size equal to the target (upscaled) presentation resolution maintains lock status 620. The two texture array configuration of the lock status 620 allows for neighboring pixels of the pixel being processed by the locking stage 609 to be read while avoiding read-modify-write conflicts. It should be understood that the locking stage 609 is not limited to image upscaling. For example, the locking stage 609 is also applicable to temporal anti-aliasing (TAA) and other techniques.

In at least some implementations, the input lock status 620-1 and the output lock status 620-2 each include lock status information for each pixel of their associated frame indicating whether the pixel is associated with a lock or is unlocked. In one or more implementations, the lock acts as a classifier indicating that the locked pixel comprises high-frequency information (e.g., luma changes between opposing neighbors of the pixel). The lock, in at least some implementations, also acts as a mask indicating that color rectification in the reproject and accumulate stage 611 is not to be performed on a pixel associated with the lock. The net effect of pixels being locked is that more of the previous frame's color data is used when computing the final, super resolution pixel color during the reproject and accumulate stage 611. For example, if shading changes between frames, a subsequent color rectification process may limit the influence of the history color such that the historical color is close to the color around the sample in the current frame 502, which results in small/thin features that are not visible in every jittered render being clamped and disappearing in the blended image. Locks increase the contribution of the samples comprising the small/thin features, which prevent these features from being clamped and disappearing in the blended image.

In one or more implementations, the lock status 620 is composed of two values, a red channel value and a green channel value. In other implementations, the lock status 620 is composed of three values, the red channel, the green channel, and a blue channel. The red channel of the lock status 620 includes the remaining lifetime of the pixel lock and is initially set based on the jitter sequence length. For example, if performing a 2× upscaling, the sequence length is 32 and the lock is potentially active for 32 frames. The length of 32 frames is stored in the red channel as the initial life/lifetime of the lock and is decreased each frame by approximately a factor of $\frac{1}{32}$ (in the 2× upscaling example). In one or more other implementations, when a pixel is locked, the locking component 520 populates the red channel of the output lock status 620-2 with a remaining lifetime value that indicates that the lock is new (i.e., created for the current frame) and whether the lock is the first/initial lock or a subsequent lock (e.g., a second lock) for the pixel. For example, the locking component 520 populates the red channel of the output lock status 620-2 with a remaining lifetime value of −1 to indicate that the lock is the first lock for the pixel, wherein the negative sign indicates that the lock is a new lock. If the pixel was locked in the previous frame, the new lock is considered a subsequent pixel lock (e.g., a second lock) and the locking component 520 populates the red channel of the output lock status 620-2 with a remaining lifetime value of −2 to indicate that the lock is new (i.e., generated for the current frame) and a subsequent lock for the pixel. In one or more implementations, if the remaining lifetime of the lock has an initial value of −1, the remaining lifetime is degraded between 0 and 1, and if the remaining lifetime of the lock has an initial value of −2, the remaining lifetime is degraded between 0 and 2. As described in greater detail below, in these implementations, instead of decreasing the remaining lifetime by a factor of $\frac{1}{32}$ (in the 2× upscaling example), the remaining lifetime is dynamically degraded as a function of the locked pixel's contribution to the final color for the current frame. Also, when the final lock for the pixel is stored during the reproject and accumulate stage 611, the absolute value of the remaining lifetime is stored. Therefore, in at least some implementations, the red channel of the final output lock status 620-2 comprises a non-negative value for the remaining lifetime. As such, when the final output lock status 620-2 becomes the input lock status 620-1 for the next frame, the remaining lifetime stored in the red channel is also a non-negative value.

The green channel of the lock status 620 includes the current luminance of the current frame 502 (e.g., the average luma of the scene in the area around the pixel) at the time the pixel was locked and is obtained by the lock status 620 from the luminance texture 606. In at least some implementations, the locking component 520 populates the green channel of the lock status 620 during the reprojection stage of reproject and accumulate stage 611. The luminance information stored in the green channel of the lock status 620 currently being generated is used by the reproject and accumulate stage 611 when processing the next frame. The luminance value stored in the green channel of the lock status 620 is used in the reproject and accumulate stage 611 as part of the shading change detection for the current frame 502, which allows upscaler 332 to unlock a pixel if there is a discontinuous change to the pixel's appearance (e.g., an abrupt change to the shading of the pixel). The blue channel of the lock status 620, in at least some implementations, is populated with a confidence/trust factor that indicates how trustworthy the associated lock is. It should be understood that each of the remaining lock lifetime information, the current luminance information, and the confidence/trust factor can be interchangeably stored in any of the red channel, green channel, and blue channel of the lock status 620.

In one or more implementations, the locking component 520 determines if a lock is to be created for a pixel of the current frame 502 by comparing a neighborhood (e.g., 3×3 pixels) of luminance values associated with the pixel against a luminance difference threshold. Stated differently, the locking component 520 determines if the relative luminance difference between the pixel and the neighborhood is below the luminance difference threshold. The luminance difference can be characterized as max(A,B)/min(A,B), where A and B are luminance/luma values. One example of a luminance difference threshold is s given percentage of similarity to the center luminance of the neighborhood of pixels (e.g., 3×3). The locking component 520 obtains the luminance values from the adjusted color buffer 608. The use of the neighborhood allows the locking component 520 to detect thin features (e.g., wires or chain-linked fences) in the current frame 502 that should be locked in order to preserve details in the final super resolution frame/image. If the shading change difference (e.g., a luminance difference) between the pixel and the neighborhood of luminance values satisfies a luminance change threshold, the locking component 520 locks the pixel by creating an entry in the output lock status 620-2. For example, if the luminance change is below (or equal to) the luminance change threshold, the locking component 520 locks the pixel. Otherwise, the locking component 520 maintains a current lock status (e.g., an unlocked state) of the pixel, which, in at least some implementations, is also reflected in the output lock status 620-2. In more detail, the locking component 520 compares the luminance value of a center pixel in a 3×3 region to the luminance value of a neighboring pixel in a 3×3 (or other) neighborhood. If the relative luminance difference between the center pixel and neighboring pixel is below the luminance difference threshold, the locking component 520 sets a bit in a mask. The locking component 520 considers the center pixel a candidate for locking if the luminance of the center pixel is outside of the luminance range of all neighboring pixels. After the locking component 520 has compared the luminance of the center pixel to all of the neighboring pixels, the locking component 520 determines if the resulting mask is noisy, i.e., does not have a 2×2 (or other) region where all bits are set. If the mask is noisy and the luminance of the center pixel is outside of the luminance range of all neighboring pixels, the locking component 520 generates a lock for the center pixel and stores the lock in the output lock status 620-2.

In addition to creating new locks, the locking component 520 (or another component of the upscaler 332) also updates the locks in the input lock status 620-1, which were generated for the previously upscaled frame. For example, the locking component 520 decrements the red channel value of a pixel lock in the input lock status 620-1, which was generated for the previously upscaled frame, by the initial pixel lock length divided by the total length of the jitter sequence (of the color buffer/camera). For example, if the initial length of a lock is initially set to 1, then subtracting 1/JitterSequenceLength from the remaining lifetime of the lock results in the remaining lifetime of the lock becoming 0 after one iteration of the jitter sequence. In another implementation, the locking component 520 (or another component of the upscaler 332) dynamically decrements/degrades the red channel value of a pixel lock in the input lock status 620-1 as a function of the locked pixel's contribution to the final color for the current frame. When a lock reaches zero (or another threshold), the locking component 520 considers the lock to be expired and releases the lock. In one or more implementations, the initial length of a lock is modified by a trust/confidence factor indicating how confident the locking component 520 is that the associated pixel should be locked, which affects how long the pixel will be locked. The locking component 520 also updates one or more locks in the input lock status 620-1 by releasing the lock(s), as descried below.

In the reproject and accumulate stage 611, the reproject and accumulate component 522 takes as input the disocclusion mask 618, the dilated motion vector buffer 614, the reactivity mask 602, the output buffer 506-1 of the previous frame, the current luminance texture 606, the luminance history 610, the adjusted color buffer 608, and the lock status 620. The reproject and accumulate component 522 processes this input to generate an output buffer (texture) 506-2 for the current frame 502 at the target presentation resolution/size and to also generate reprojected pixel locks (texture) 622 from the previous frame that are mappable to the current frame 502. As described below, the reproject and accumulate component 522 accumulates reprojected color data from the previous frame together with upsampled color data from the current frame 502 and stores the accumulated color data in the output buffer 506-2. In one or more implementations, the output buffer 506-2 is a texture that is used internally by the upscaler 332 and is distinct from a presentation buffer 626 generated by the sharpening stage 613. Also, in one or more implementations, the output buffer 506-2 is part of an output buffer 506 represented as an array of two additional textures (e.g., output buffer 506-1 and output buffer 506-2) consumed by the reproject and accumulate stage 611. In odd frames, output buffer 506-1 is read and output buffer 506-2 is written (or vice versa). In even frames, output buffer 506-2 is read and output buffer 506-1 is written (or vice versa).

Figure 9:
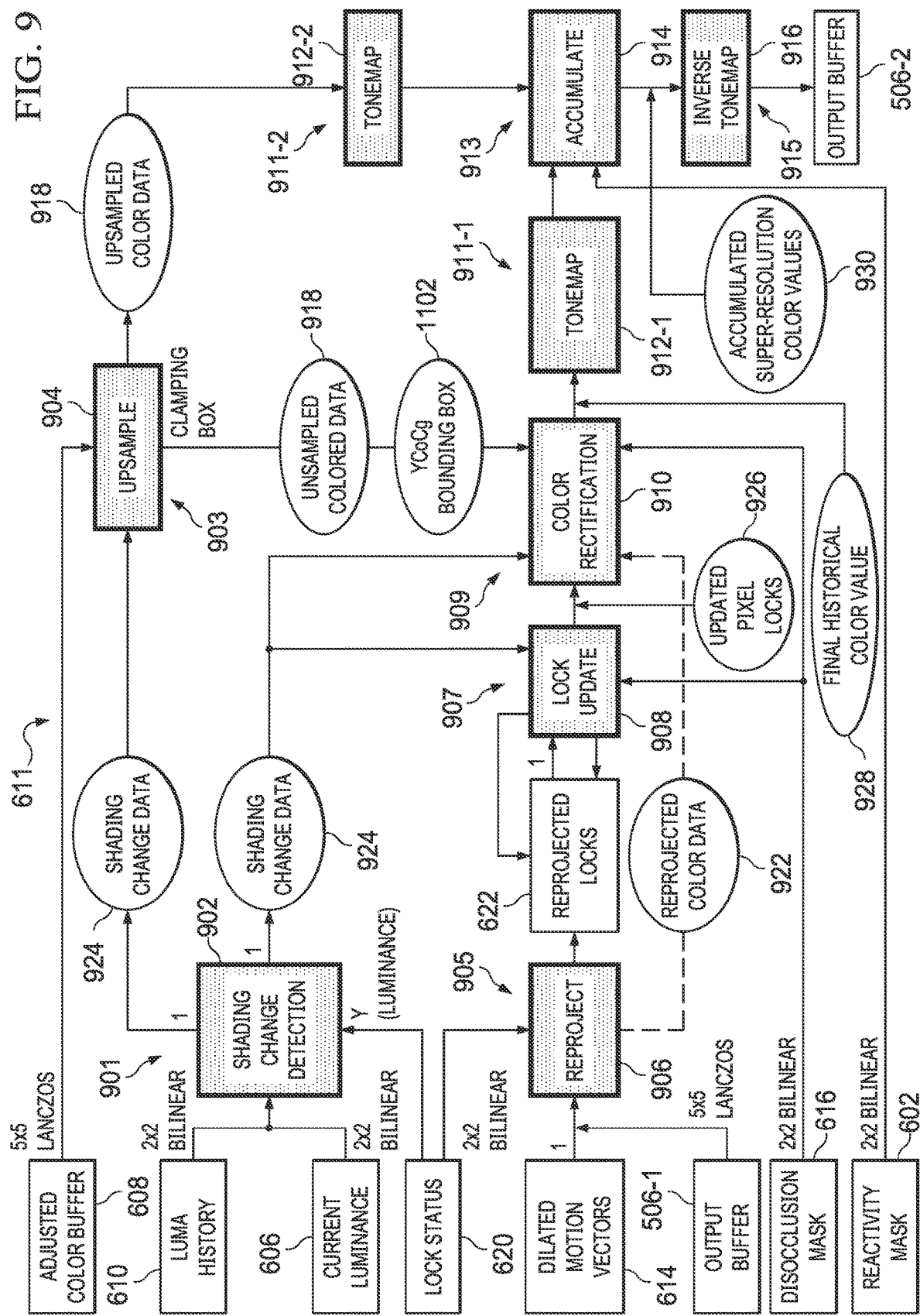
FIG. 9 is a block diagram illustrating the various sub-stages of a reproject and accumulate stage of the super resolution upscaler of FIG. 5 in accordance with some implementations.

The reproject and accumulate stage 611 is comprised of multiple sub-stages as shown in FIG. 9. In one or more implementations, the sub-stages of include a shading change detection sub-stage 901, an upsampling sub-stage 903, a reprojection sub-stage 905, a lock updating sub-stage 907, a color rectification sub-stage 909, one or more tonemapping sub-stages 911 (illustrated as tonemapping sub-stage 911-1 and tonemapping sub-stage 911-2), an accumulation sub-stage 913, and an inverse-tonemapping sub-stage 915. The reproject and accumulate component 522, in at least some implementations, includes one or more sub-components 902 to 914 that perform the operations associated with one or more of the reproject and accumulate sub-stages 901 to 913.

In one or more implementations, the reproject and accumulate stage 611 is performed on a per frame basis and the data flow illustrated in FIG. 9 is executed in parallel for each pixel once per output/presentation resolution pixel and the data flow illustrated in FIG. 9 is executed in parallel for every pixel of the upscaled frame 508. In FIG. 9, the "2×2 bilinear" reference indicates that bilinear sampling is performed at the corresponding stage, the "5×5 Lanczos" reference indicates that Lanczos resampling is performed at the corresponding stage, and the "1" reference indicates a point sampling is performed. However, it should be understood that other types of sampling are applicable as well.

As described below, the reproject and accumulate component 522, via one or more of the sub-components 902 to 914, performs multiple operations including upsampling of the color buffer 320-1 for the current frame 502, reprojecting the (historical) color data 922 and the pixel locks provided by the output buffer 506-1 of the previous frame as if they were viewed from the current camera's perspective, cleaning the reprojected color data 922, accumulating final historical color data/values 928 (FIG. 9) and upsampled color data 918 for the current frame 502, and optionally inverse-tonemapping the super resolution color values 930 generated by the reproject and accumulate stage 611 for sharpening.

At the initiation of the reproject and accumulate stage 611, the shading change detection sub-stage 901 takes the luminance history 610, the current luminance texture 606, and the input lock status 620-1. A shading change detection component 902 processes this input to assess each pixel of the current frame 502 for detecting changes in the shading of the pixel. In one or more implementations, the shading change detection component 902 also performs texture filtering, such as bilinear filtering, on these inputs. In one example, the shading change detection component 902 uses the lock status 620-1 of the current pixel in the previously upscaled frame to determine if the pixel is locked or unlocked. If the pixel is locked, the shading change detection component 902 determines if shading of the pixel has changed by comparing the luminance (Y) value of the pixel at the time the lock was created to a shading change threshold. In one or more implementations, the shading change detection component 902 compares the luminance of the pixel to the average luminance of a neighborhood (e.g., 32×32) of pixels in the current frame 502. If the difference between the luminance of the pixel and the average luminance of the neighborhood of pixels satisfies (e.g., is greater than or, alternatively, equal to) the shading change threshold, then the shading change detection component 902 determines that the shading of the pixel has changed. In one or more implementations, the shading change detection component 902 obtains the luminance of the pixel from the green channel of the input lock status 620-1 for the pixel. If the pixel is unlocked, the shading change detection component 902, in one or more implementations, determines if the shading of the pixel has changed based on the luminance value of the pixel in the current frame and the historical luminance value(s) of the pixel or neighborhood of historical pixels. For example, if the difference between the luminance value of the pixel in the current frame and the historical luminance value(s) of the pixel (or neighborhood of historical pixels) satisfies a shading change threshold, then the shading change detection component 902 determines that the shading of the pixel has changed. In one or more implementations, the shading change detection component 902 obtains the current luminance value for the pixel from the current luminance texture 606 and obtains the historical luminance values of the pixel from the luminance history

610. The shading change detection component 902 generates shading change data 924 including, for example, a bit/flag indicating whether the shading of the pixel has changed. The shading change data 924 is received as an input by the upsampling sub-stage 903, the lock updating sub-stage 907, and the color rectification sub-stage 909.

An upsampling component 904 of the upsampling sub-stage 903 takes the shading change data 924 from the shading change detection component 902 and the adjusted color buffer 608 as input for upsampling the adjusted color buffer 608. In one or more implementations, the upsampling component 904 uses the shading change data to alter the shape of a filter kernel, which potentially results in lower or higher sample weights being used in the accumulation sub-stage 913. Upsampling the adjusted color buffer 608 involves interpolating between the existing pixels of the adjusted color buffer 608 to obtain an estimate of their values at new pixel locations. For example, if the current frame 502 is being upsampled from 1920×1080 pixels to 3840×2160 pixels, the upsampling component 904 interpolates between the original 1920×1080 pixels to estimate the color values for the new pixels upsampled to the higher 3840×2160 pixel resolution. In at least some implementations, the upsampling component 904 implements Lanczos resampling to upscale the pixels of the adjusted color buffer 608, although one or more different scaling techniques or algorithms, such as Sinc resampling, nearest-neighbor interpolation, bilinear algorithms, bicubic algorithms, box sampling the like, or a combination thereof are applicable as well.

Figure 10:
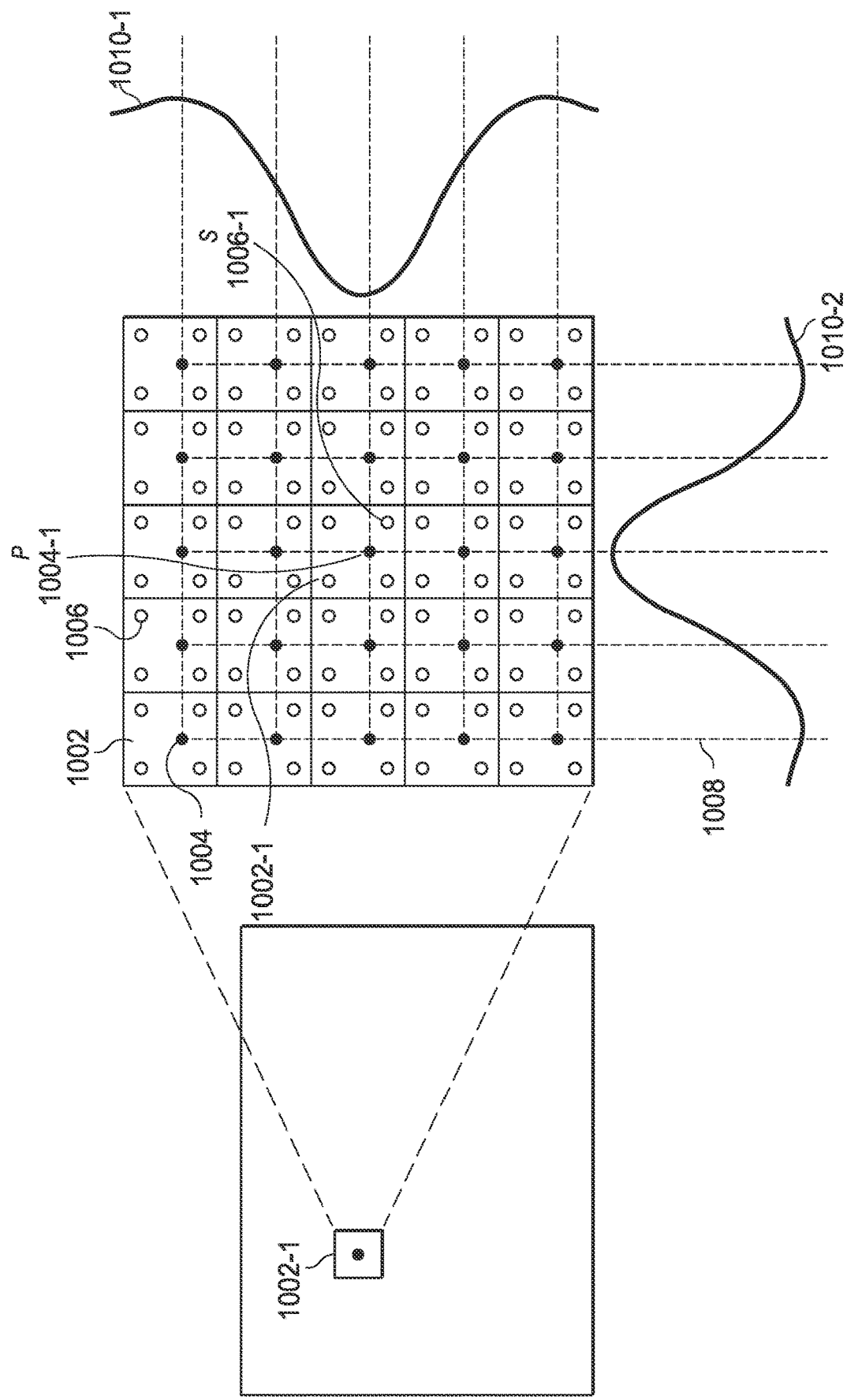
FIG. 10 is a diagram illustrating an example resampling process performed by an upsampling component of the super resolution upscaler of FIG. 5 in accordance with some implementations.

In general, Lanczos resampling is an interpolation method used to compute new values for digitally sampled data. When used for resizing digital images, the Lanczos function indicates which pixels in the rendered (original) image, and in what portion, make up each pixel in the upsampled image. For example, FIG. 10 shows a plurality of rendered pixels 1002 from the current frame 502. In each rendered pixel 1002, the point P represents the set of low-resolution samples 1004 to resample from and for which the Lanczos weights are calculated. Each point S in a pixel 1002 represents the presentation resolution target pixel 1006 (also referred to herein as upsampled pixel 1006) to compute based on resampling from the set of low-resolution samples 1004. The position of the pixel 1002-1 being upsampled serves as the center of a Lanczos resampling kernel 1008, such as a 5×5 Lanczos resampling kernel, which is represented in FIG. 10 by the grid of dashed lines. The Lanczos functions 1010 (illustrated as Lanczos function 1010-1 and Lanczos function 1010-2) are centered around the upsampled pixel 1006-1 being computed. As such, the color value for an upsampled pixel 1006-1 is determined by applying the Lanczos resampling kernel 1008 (e.g., Lanczos (x, 2)) to the low-resolution samples 1004-1 in the 5×5 neighborhood (grid) of pixels surrounding the upsampled pixel 1006-1. Stated differently, the weight of each low-resolution sample 1004 in the 5×5 neighborhood of pixels is determined using Lanczos resampling and the distance of the low-resolution sample 1004 to the presentation resolution target pixel 1006-1. The final color value of the upsampled pixel 1006-1 is based on the sum of the weights of each low-resolution sample 1004 in the 5×5 neighborhood of pixels. In some instances, Lanczos resampling can introduce ringing artifacts. Therefore, in one or more implementations, the final color value of the upsampled pixel 1006-1 is clamped using, for example, the center 2×2 kernel range to mitigate any ringing artifacts.

Although, the example described above implements a 5×5 neighborhood of pixels during the Lanczos resampling process, in some instances, a 4×4 neighborhood is sampled due to the zero weighted contributions of the pixels on the periphery of the 5×5 neighborhood. Also, in one or more aspects, the implementation of the Lanczos kernel varies based on the GPU being implemented. For example, for one or more GPU implementations, a look-up-table (LUT) can be used to encode the sinc(x) function for the Lanczos kernel. Utilizing the LUT provides a balance between arithmetic logic (ALU) operations and memory usage in the reproject and accumulate stage 611. For example, for any given jitter, the Lanczos values for the samples used are the same for every pixel of the frame. Therefore, in one or more implementations, these Lanczos values are precomputed and stored in the LUT. The LUT is passed to the shader implementing the upsampling component 904 as a texture. Then, instead of repeatedly computing the Lanczos values, the precomputed Lanczos values, which are likely resident in cache, are repeatedly read in the shader by the upsampling component 904. In one or more implementations, the LUT is read through the fixed function sampling blocks to reduce ALU usage of the shader cores. If the shader stages are not bandwidth limited, implementing the LUT is faster than spending ALU cycles.

Figure 11:
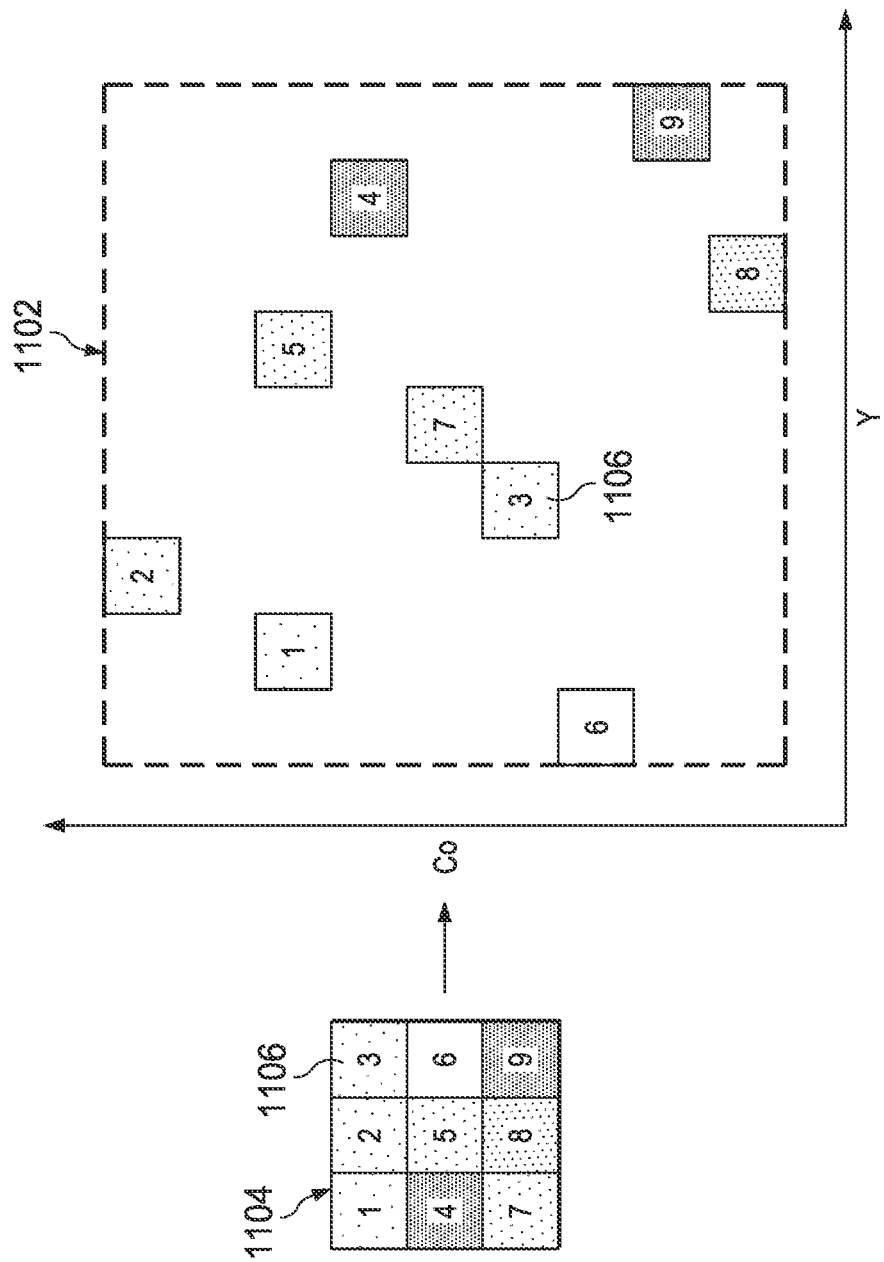
FIG. 11 is a diagram illustrating an example of a color bounding box construction process performed by the upsampling component of the super resolution upscaler of FIG. 5 in accordance with some implementations.

In at least some implementations, the upsampling component 904 also calculates the YCoCg bounding box 1102 (FIG. 11) for each pixel being upsampled. For example, FIG. 11 shows a YCo bounding box 1102 being constructed from a 3×3 neighborhood 1104 of pixels around the current pixel (e.g., pixel 1002-1 in FIG. 10). It should be understood that the bounding box 1102 also has a third dimension for Cg (which is not shown for illustration purposes). The bounding box 1102 is used during the color rectification sub-stage 909 described below. In one or more implementations, the upsampling component 904 generates the bounding box 1102 for each pixel in the current frame 502 by computing the minimum and maximum values of each channel for all pixels in a neighborhood (e.g., 3×3) surrounding the current pixel. The different shading/pattern of the squares 1106 in the 3×3 neighborhood 1104 of pixels represent Y values of the pixels. The position of each square in the bounding box 1102 represents where inside the bounding box 1102 a sample is located. In at least some implementations, the output of the upsampling sub-stage 903 includes upsampled (pixel) color data/values 918 for the upsampled pixels (i.e., pixels upsampled to the presentation resolution) generated for the current frame 502 and includes the YCoCg bounding box 1102 generated for each upsampled pixel.

Figure 12:
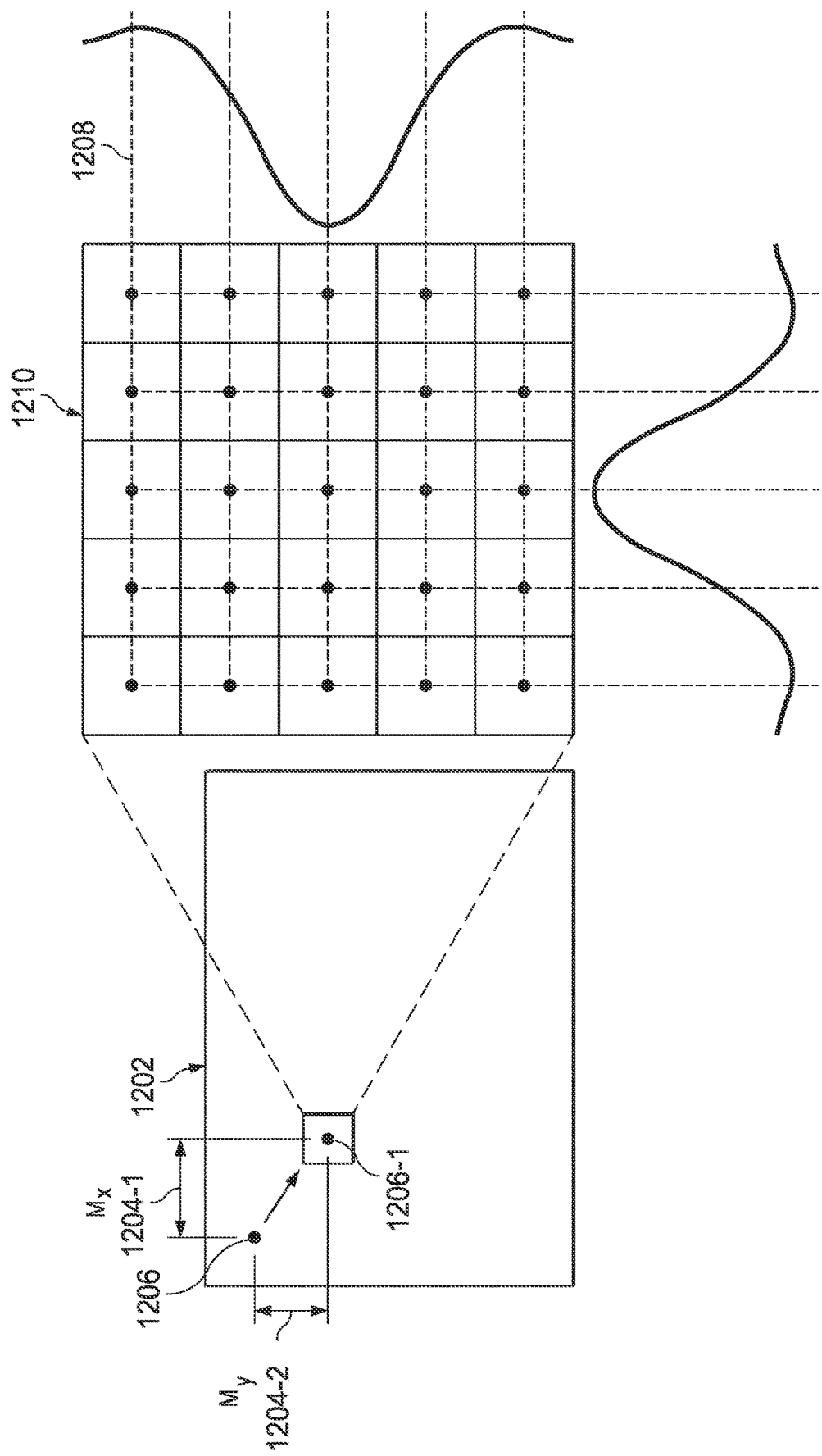
FIG. 12 is a diagram illustrating an example of a color data reprojection process performed by a reprojection component of the super resolution upscaler of FIG. 5 in accordance with some implementations.

A reprojection component 906 of the reproject sub-stage 905 takes as input the dilated motion vector buffer 614, the input lock status 620-1, and the output buffer 506-1 of the previously upscaled frame (i.e., the frame previously processed by the upscaler 332). The reprojection component 906 processes this input for pixels that do not have a new lock generated for the current frame 502 to reproject the output color buffer from the output buffer 506-1 and the pixel lock information from the input lock status 620-1 of the previous frame, as if viewed from the camera perspective of the current frame 502. For example, FIG. 12 shows a frame 1202 representing the previously upscaled frame. The reprojection component 906 samples the dilated motion vectors in the dilated motion vector buffer 614. Then, the reprojection component 906 applies the sampled motion vectors 1204 (illustrated as motion vector 1204-1 and motion vector 1204-2) to the output buffer 506-1 (e.g., color data) of the previously upscaled frame. FIG. 12 shows the sampled two-dimensional motion vectors 1204 being applied to the position of a current pixel 1206 from the output buffer 506-1 of the previously upscaled frame. Described differently, the reprojection component 906 subtracts the sampled motion vectors 1204 from the position coordinates of the current pixel to obtain historical coordinates. The reprojection component 906 then samples the input lock status 620-1 and historical color information (from the output buffer 506-1) using the historical coordinates (translated pixel positions).

In one or more implementations, the reprojection component 906 performs Lanczos resampling to sample a neighborhood of pixels surrounding the translated pixel position. For example, FIG. 12 shows a Lanczos (x, 2) resampling kernel 1208 being applied to the 5×5 grid 1210 of pixels surrounding the translated pixel position 1206-1. The reprojection component 906, in one or more implementations, uses bilinear interpolation at the translated pixel positions to reproject the locks. As such, the output of the reprojection sub-stage 905 is a presentation resolution image that includes all the data from the previous frame that is mappable into the current frame 502. Stated differently, the output of the reprojection sub-stage 905 is reprojected color data 922 and reprojected pixel locks 622 of pixels in the previously upscaled frame that are mappable to the current frame 502. For example, the remaining lifetime from the red channel, the current luminance of the current frame 502 from the green channel, and the confidence/trust factor from the blue channel (if implemented) of the input lock status 620-1 of a pixel that does not have a new lock generated for the current frame 502 is reprojected/written as a reprojection lock 622. A reprojection lock 622, in one or more implementations, refers to reprojected lock information written to the output lock status 620-2 of a pixel or reprojected lock information stored in an intermediate lock texture. The reprojection component 906, in at least some implementations, determines if a new lock has been generated for a pixel based on the output lock status 620-2 of the pixel including a negative remaining lifetime value. In one or more implementations, if the input lock status 620-1 of a pixel indicates that the pixel has only been locked once (e.g., remaining life value is "1"), the lock is not active and the reprojection component 906 does not perform reprojection operations for the pixel. In at least some implementations, the reprojected pixel locks 622 are reprojected into the output lock status 620-2 and used as locks for pixels in the current frame 502 that are not updated with new sample information, whereas the pixel locks generated during the locking stage 609 are used for pixels that have an updated sample in their region. It should be understood that the lock reprojection process of the reprojection sub-stage 905 is not limited to image upscaling. For example, the lock reprojection process is also applicable to TAA and other techniques.

A lock update component 908 of the lock update sub-stage 907 takes as input the disocclusion mask 618, the reprojected locks 622, and the shading change data 924. The lock update component 908 processes this input to generate an updated set of pixel locks 926. Here, updating the pixel locks includes identifying the set of pixel locks from the reprojected locks 622 that are to be passed to the color rectification sub-stage 909. For example, if the lock update component 908 determines that the disocclusion mask 618 indicates that a pixel associated with a reprojected pixel lock has become occluded, the lock update component 908 releases the lock. In another example, the lock update component 908 determines that the shading change data 924 indicates that a shading of a pixel associated with a reprojected pixel lock has changed more than a shading change threshold, the lock update component 908 releases the lock. The lock update component 908, in one or more implementations, also updates the reprojected locks to reflect decay and released locks.

The lock update component 908 then determines which of the remaining reprojected locks are trustworthy for the current frame 502. In one or more implementations, the lock update component 908 determines the trustworthiness of a pixel lock by comparing the luminance value associated with the pixel lock (i.e., the luminance value of the pixel at the time the pixel lock was created) to the luminance values in the current luminance texture 606, which represent the average luminance of the scene in a neighborhood of pixels around the pixel associated with the current pixel lock. If the luminance separation between the compared luminance values exceeds (or is equal to) a luminance separation threshold, then the lock update component 908 determines that the pixel lock is not trustworthy and releases the lock. However, if the luminance separation between the compared luminance values is below (or is equal to) the luminance separation threshold, then the lock update component 908 determines that the pixel lock is trustworthy and maintains the pixel lock.

In one or more implementations, the lock update component 908 also processes the input to identify new pixel locks created during the locking stage 609 of the current frame 502 that are not reprojected. As described above, the lock update component 908, in at least some implementations, identifies a new pixel lock based on the red channel of the output lock status 620-2 having a negative value or based on the remaining Block lifetime being equal to the initial lock lifetime. When a new pixel lock is identified, the lock update component 908 does not perform the lock releasing operations described above for the new pixel lock. However, in one or more implementations, the lock update component 908 updates the green channel of the output lock status 620-2 for a new pixel lock that is active (e.g., a pixel lock that is at least the second pixel lock for the pixel) with the current luminance information from the current luminance texture 606. In one or more implementations, the lock update component 908 also updates the confidence/trust factor of the pixel lock stored in the blue channel (if implemented) of the lock status 620 of the new active pixel locks and reprojected pixel locks. For example, in at least some implementations, the lock update component 908 increases the confidence/trust factor for new pixel locks and reprojected locks based on the current upsample weight contribution of their associated pixel. The increase value is within the normalized range [0,1] and determined by dividing the current frame upsample weight (e.g., the Lanczos weight calculated in the upsampling sub-stage 903) by a constant value, for example the maximum accumulation weight. The increase value is added to the current confidence/trust factor stored in the blue channel of the lock status 620. In at least some implementations, the confidence/trust factor is clamped to [0,1] range.

The lock update component 908, in one or more implementations, also decreases the lock lifetime of the new pixel locks and reprojected locks. For example, the lifetime of a reprojected lock or a new pixel lock is decreased by approximately a factor of ⅟₃₂ (in a 2× upscaling example). In another example, the lifetime of a reprojected lock or a new pixel lock is dynamically degraded as a function of the locked pixel's contribution to the final color for the current frame, i.e., the current upsample weight contribution. In at least some implementations, the lock update component 908 computes a decrease value by dividing the current frame upsample weight by a factor based on jitter sequence length and the average upsample kernel weight. The decrease value, in one or more implementations, is within the normalized range [0,1]. The lock update component 908 then updates the remaining lifetime of the pixel lock stored in the red channel of the lock status 620 by subtracting the decrease value from the current remaining lifetime of the pixel lock. In one or more embodiments, the resulting value is clamped to [0,1] range to avoid a negative lifetime value.

The output of the lock update sub-stage 907 is a set of updated locks 926 (i.e., lock statuses 620) that includes reprojected pixel locks 622 that have been determined to be trustworthy or, alternatively, includes the set of reprojected locks 622 with an indicator associated with each lock that identifies if the lock is trustworthy or untrustworthy. The set of updated pixel locks 926, in one or more implementations, further includes pixel locks that have been newly created for the current frame 502 and are active. In at least some implementations, each reprojected pixel lock in the set of updated locks 926 includes an updated remaining lifetime, luminance value, and confidence/trust factor, and each newly generated active lock includes an updated luminance value and confidence/trust factor as described above. The updated output lock statuses 620-2 for the new pixel locks are subsequently stored in the output buffer 506-2 for use during upsampling of the next frame. It should be understood that the lock update sub-stage 907 is not limited to image upscaling. For example, the lock update sub-stage 907 is also applicable TAA and other techniques.

The set of updated locks 926 is then passed to the color rectification sub-stage 909 as an input. The color rectifier component 910 of the color rectification sub-stage 909 takes as input, for example, the upsampled color data 918 for the upsampled pixels of the current frame 502, the color data 922 for the reprojected pixels of the previously upscaled frame, the updated set of locks 926, the disocclusion mask 618, the luma stability factor (e.g., .w channel of the luma history 610), the shading change data 924, and a lock contribution factor of a newly locked pixel or a reprojected locked pixel. The lock contribution factor is calculated as a function of the weight of the upsampled color data 918, an optional transparency and composition mask, and the optional reactivity mask 602. The color rectifier component 910 processes the input to determine a final historical color data/value 928 for each upsampled pixel of the current frame 502 and its contribution to the final upscaled pixel color. In one or more implementations, when determining the final historical color value 928 for each upsampled pixel, the color rectifier component 910 reduces the influence of the historical samples based on various factors including, among others, lock status or disocclusion. Stated differently, the color rectifier component 910, in some instances, modifies the historical color value to align with the shading of the current frame 502. For example, if a pixel location has been (partly) disoccluded, this means that the pixel location was occluded in the previously upscaled frame. Therefore, the historical color data for the pixel location is no longer valid for increasing the quality of the current pixel. As such, the color rectifier component 910 reduces the influence of historical samples for pixels that have become disoccluded to avoid artifacts, such as ghosting. In this example, the color rectifier component 910 reduces the influence of a historical sample by modulating the color value of the historical sample by the disocclusion mask 618.

Figure 13:
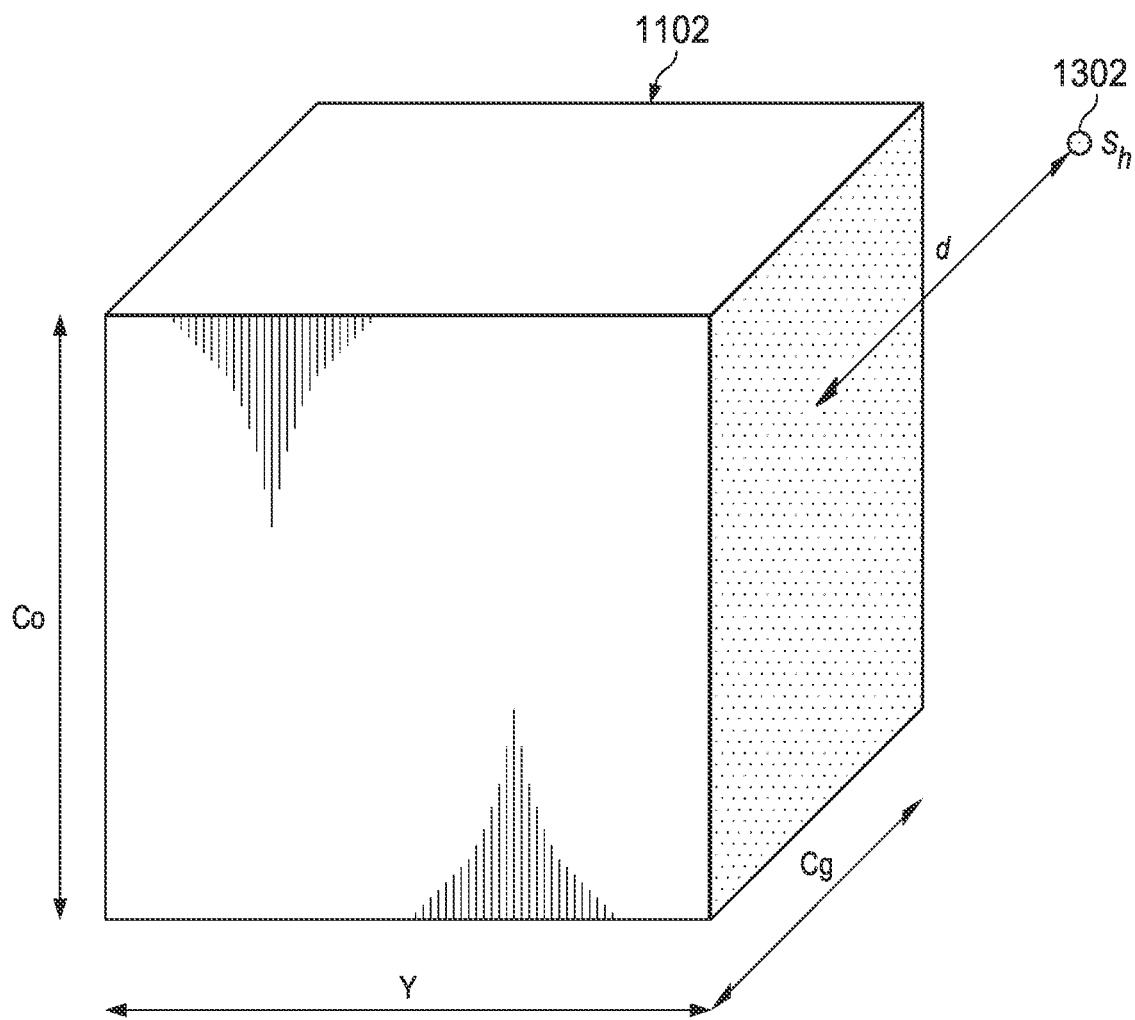
FIG. 13 is a diagram illustrating an example of color rectification process performed by a color rectifier component of the super resolution upscaler of FIG. 5 in accordance with some implementations.

FIG. 13 shows another example in which the rectifier component 910 reduces the influence of historical samples ($S_h$) 1302 based on their distance (d) from the color bounding box 1102 of the upsampled pixels. In this example, the farther the distance (d), the more the influence of the historical sample 1302 is reduced by the color rectifier component 910. In one or more implementations, if the color rectifier component 910 determines that a historical sample is locked based on the updated set of locks 926 and also determines that the reactivity mask 602 or the disocclusion mask 618 do not make the lock invalid, the color rectifier component 910 increases the influence of the historical color data of the historical sample relative to the upsampled color data 918.

In one or more implementations, at least one of the upsampled color data 918 or the final historical color data 928 is passed to a tonemapping sub-stage 911 (illustrated as tonemapping sub-stage 911-1 and tonemapping sub-stage 911-2). For example, if the upsampled color data 918 or the final historical color data 928 comprises high dynamic range data, then the upsampled color data 918 or the final historical color data 928 is passed to the tonemapping sub-stage 911, respectively. A tonemapping component 912 (illustrated as tonemapping component 912-1 and tonemapping component 912-2) then applies one or more local tonemapping operations on the upsampled color data 918 or the final historical color data 928 to reduce artifacts, such as firefly artifacts. In one or more implementations, tonemapping ensures color values are in the range from 0 to 1 by dividing the color by the maximum channel value, e.g., Color.rgb=color.rgb/(1+max(max(color.r, color.g), color.b), where max is the maximum channel value, color.r is the red channel value, color.g is the green channel value, and color.b is the blue channel value.

An accumulating component 914 of the accumulation sub-stage 913 takes as input the upsampled color data 918 and the final historical color data 928 for each pixel of the current frame 502, which may or may not have been tonemapped. The accumulating component 914, for each upsampled pixel of the current frame 502, accumulates (e.g., blends) the upsampled color data 918 with the final historical color data 928 of the upsampled pixel to collectively form the final accumulated super resolution color values 930 of an upsampled version the current frame 502. An implicit result of the temporal accumulation of multiple frames during the accumulation sub-stage 913 is that the resulting final accumulated super resolution color values 930 are anti-aliased. In one or more implementations, the accumulating component 914 blends the upsampled color data 918 of the current frame 502 and the final historical color data 928 with a relatively low linear interpolation factor such that a low amount of color data from the current frame 502 is included in the super resolution color values 930 of the upscaled frame 508. Stated differently, the final historical color data 928 determined for each upsampled pixel contributes more to the final accumulated super resolution color values 930 than upsampled color data 918 of the current frame 502. Blending the two color values can be characterized as follows: Blended Value=A*(1−W)+B*W, where A is the final historical color data 928, B is the color data from the current frame 502, and W is a contribution weight. In one or more implementations, the contribution weight of the upsampled color data 918 can be increased based on the reactivity mask 602, which the accumulating component 914 also takes as an input. The reactivity mask 602 indicates to the accumulating component 914 where it should reduce its reliance on historical information when compositing the current upsampled pixel and, instead, allow the color data 918 of the upsampled pixels to contribute more to the final accumulated super resolution color values 930 (also referred to herein as "super resolution color values 930" for brevity). For example, for a given pixel of the current frame 502, the accumulating component 914 multiples the reactivity value from the reactivity mask 602 associated with the pixel with the contribution weight W to increase the contribution weight of the upsampled color data 918. Therefore, blending the two color values taking the reactivity mask 602 into consideration can be characterized as follows: Blended Value=A*(1−(R*W)+B*(R*W), where A is the final historical color data 928, B is the color data from the current frame, and R is the reactivity value from the reactivity mask 602.

The super resolution color values 930 are stored in an output buffer 506-2 representing an upscaled version of the current frame 502 at the presentation resolution. Stated differently, the output buffer 506-2 comprises the upscaled frame 508. The output buffer 506-2, in one or more implementations, is used as the output buffer 506-1 taken as input by the upscaler 332 when processing the next frame. In one or more implementations, the super resolution color values 930 are passed to an inverse-tonemapping sub-stage 915 prior to being stored in the output buffer 506-2. In these implementations, an inverse-tonemapping component 916 inverse-tonemaps the super resolution color values 930. The inverse tonemapping process reverses the color tonemapping process described above such that the color range of the super resolution color values 930 matches the color range of the input frame 502. In one or more implementations, the inverse-tonemapping process can be characterized by Color.rgb=color.rgb/(1.f−max(max(color.r, color.g), color.b)), where f indicates a floating point number, max is the maximum channel value, color.r is the red channel value, color.g is the green channel value, and color.b is the blue channel value.

Figure 14:
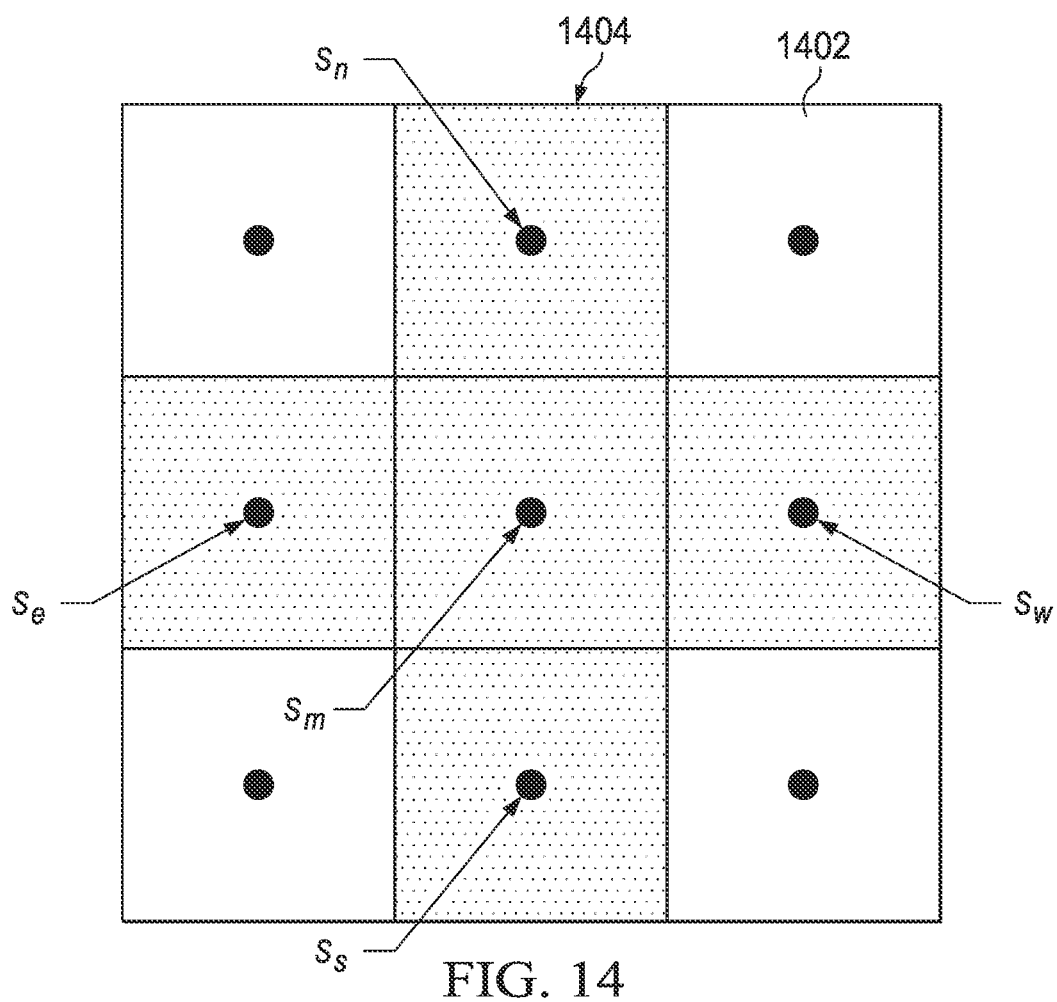
FIG. 14 is a diagram illustrating an example of filter implemented by an image sharpening component of the super resolution upscaler of FIG. 5 in accordance with some implementations.

Referring to FIG. 6, a sharpening component 524 of the sharpening stage 613 takes as input the output buffer 506-2 comprising the upscaled frame 508. The sharpening component 524 performs one or more sharpening operations on the pixels of the upscaled frame 508 represented by the output buffer 506-2. The sharpening component 524 stores the sharped upscaled frame 508 in a presentation buffer 626. In one or more implementations, the sharpening component 524 performs robust contrast adaptive sharpening (RCAS). However, other image sharpening techniques are applicable as well. RCAS generates additional clarity and sharpness in the final upscaled image and solves for the maximum local sharpness possible before clipping when converting local contrast into a variable amount of sharpness. RCAS also has a built-in process to limit the sharpening of potential noise in the image. In more detail, RCAS operates on data 1402 (FIG. 14) sampled from the output buffer 506-2 using a 5-tap filter 1404 (FIG. 14) configured in a cross pattern, as shown in FIG. 14. During the RCAS process, the sharpening component 524 calculates a weight w based on the following equations:

$$w_0 = \frac{-S_m}{(S_n + S_e + S_s + S_w)}$$ (EQ 1)

$$w_1 = \frac{1 - S_m}{(S_n + S_e + S_s + S_w) - 4}.$$ (EQ 2)

wherein $S_m$ is the middle sample, $S_n$ is the sample to the north of $S_m$, $S_e$ is the sample to the east of $S_m$, $S_s$ is the sample to the south of $S_m$, and $S_w$ is the sample to the west of $S_m$.

The sharpening component 524 selects either $w_0$ or $w_1$ based on which weight w does not result in clipping and further limits weight w. The sharpening component 524 also multiples by a "sharp" amount", which is a sharpness value provided by the application 206 that changes the perceptual sharpness of the output image. The RCAS process performs a high-pass filtering process, which is normalized against the local contrast then shaped. This process is used as a noise detection filter to reduce the effect of RCAS on grain and focus on real edges. The RCAS process also supports pass-through alpha. After the sharpening process has been completed, the sharpening component 524 stores the data for the upscaled frame 508 in the presentation buffer 626. In at least some implementations, one or more post-upscale post-processing stages 311-2 perform post-processing operations on the upscaled frame 508 stored in presentation buffer 626. The post-processed upscaled frame 508 is then output by the graphics processing pipeline 214 for presentation on the display device 118. Alternatively, the upscaled frame 508 is output by the graphics processing pipeline 214 after sharpening for presentation on the display device 118 without having any post-upscale post-processing operations performed thereon.

Figure 15:
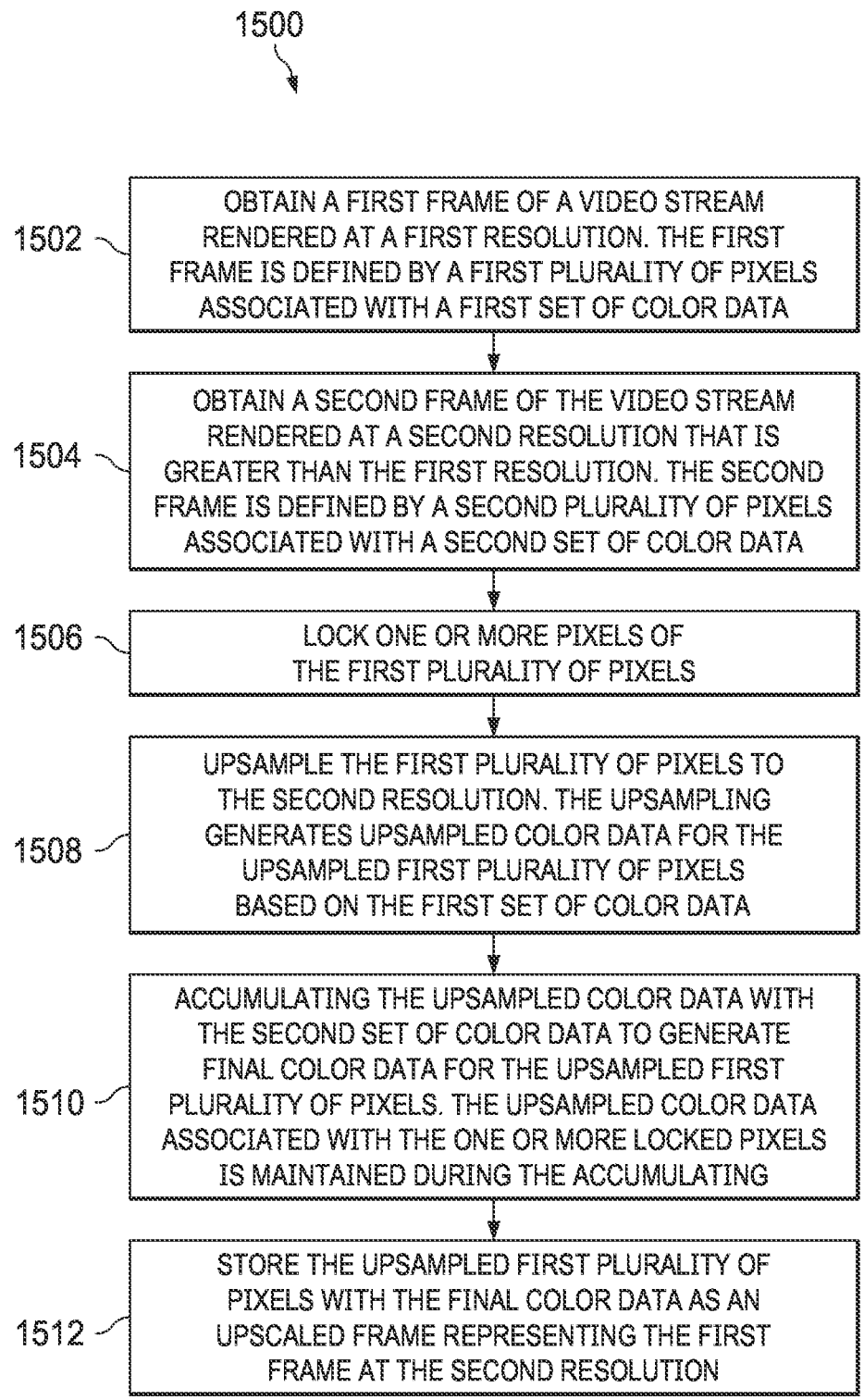
FIG. 15 is a flow diagram illustrating an overall method for spatially upscaling a rendered frame of a video stream by using temporal feedback to reconstruct a high-resolution image representing the rendered frame in accordance with some implementations.

FIG. 15 illustrates, in flow chart form, an overview of one example method 1500 of performing spatial upscaling of a rendered frame 502 of a video stream by using temporal feedback to reconstruct a high-resolution image representing the rendered frame 502. It should be understood the processes described below with respect to method 1600 have been described above in greater detail with reference to FIG. 6 to FIG. 14. At block 1502, the upscaler 332 obtains a first frame of a video stream rendered at a first resolution. The first frame is defined by a first plurality of pixels associated with a first set of color data. At block 1504, the upscaler obtains a second frame of the video stream upscaled to a second resolution that is greater than the first resolution. The second frame is defined by a second plurality of pixels associated with a second set of color data. At block 1506, the upscaler locks one or more pixels of the first plurality of pixels. At block 1508, the upscaler 332 upsamples the first plurality of pixels to the second resolution. The upsampling generates upsampled color data for the upsampled first plurality of pixels based on the first set of color data. At block 1510, the upscaler 332 accumulates the upsampled color data with the second set of color data to generate final color data for the upsampled first plurality of pixels. The upsampled color data associated with the one or more locked pixels is maintained during the accumulation of upsampled color data of at least one of the rendered frame or a subsequent frame. Also, color data of the second set of color data associated with a pixel lock contributes more to the final color data than corresponding color data of the upsampled color data. At block 1512, the upscaler 332 stores the upsampled first plurality of pixels with the final color data as an upscaled frame representing the first frame at the second resolution.

Figure 16:
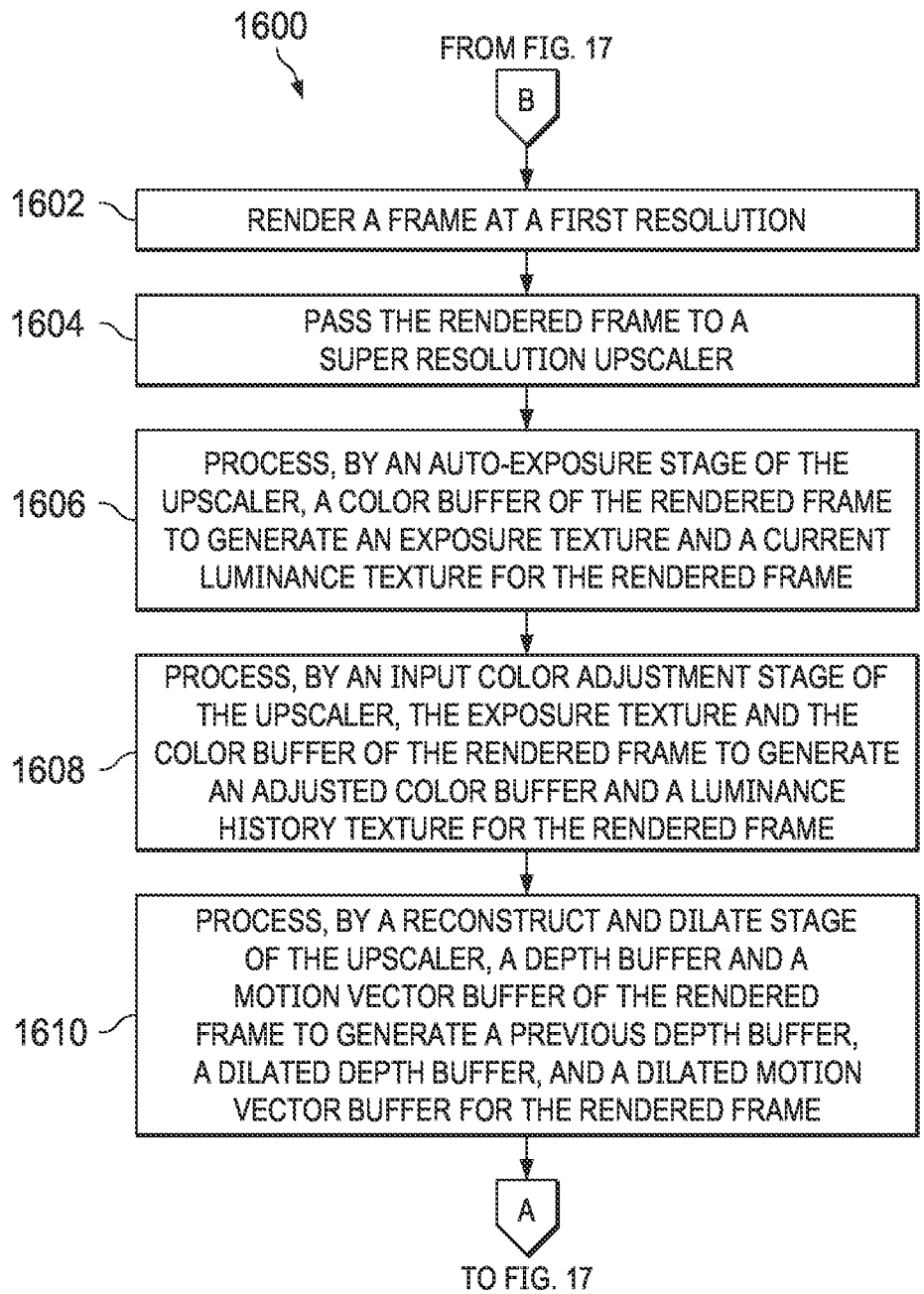
FIG. 16 and FIG. 17 together are a flow diagram illustrating another overall method for spatially upscaling a rendered frame of a video stream by using temporal feedback to reconstruct a high-resolution image representing the rendered frame in accordance with some implementations.
Figure 17:
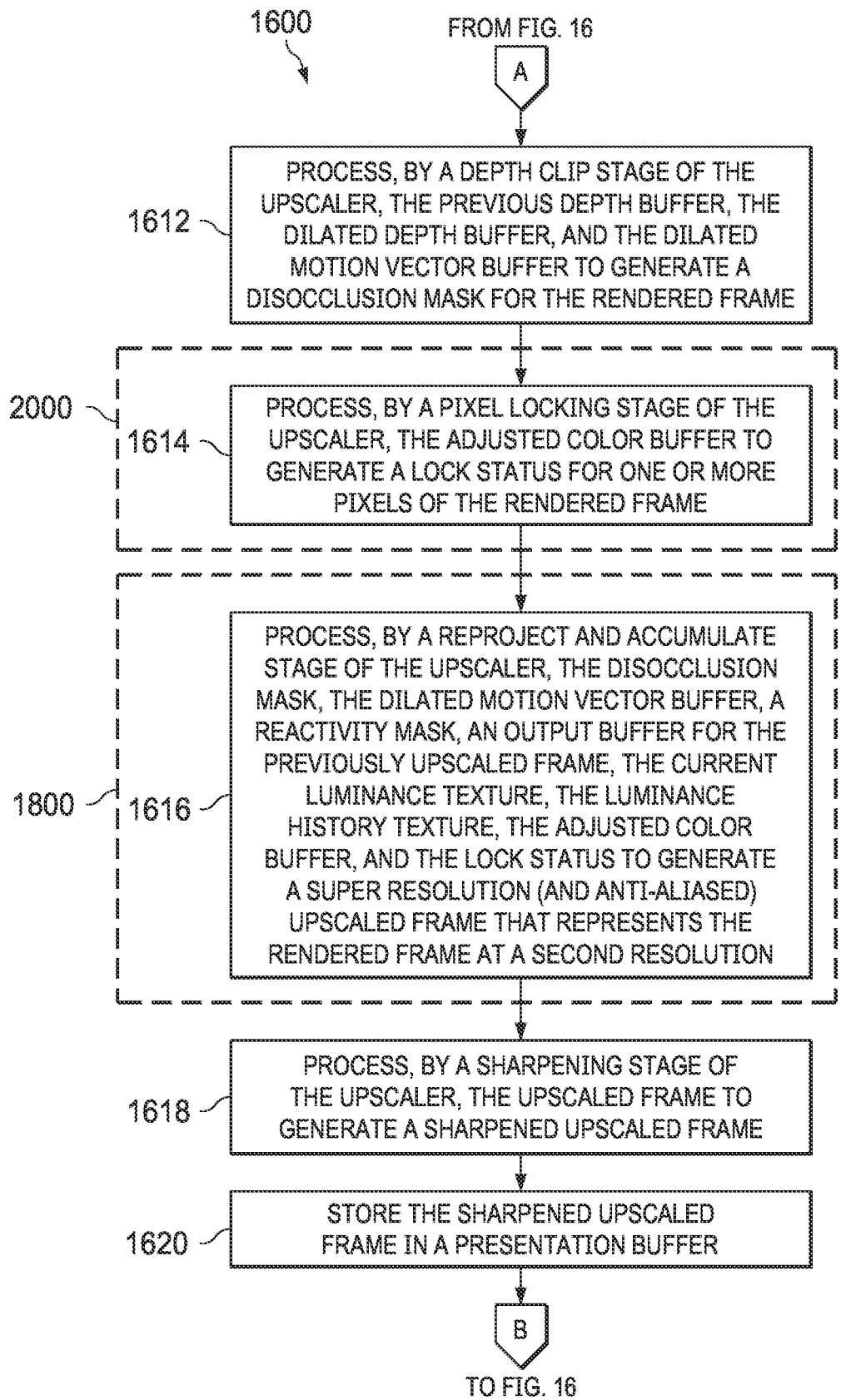

FIG. 16 and FIG. 17 together illustrate, in flow chart form, an overview of another example method 1600 of performing spatial upscaling of a rendered frame 502 of a video stream by using temporal feedback to reconstruct a high-resolution image representing the rendered frame 502. It should be understood the processes described below with respect to method 1600 have been described above in greater detail with reference to FIG. 6 to FIG. 14. At block 1602, the rendering stage 313 of the graphics pipeline 214 renders a frame 502 at a first resolution. At block 1604, the rendered frame 502 is passed to a super resolution upscaler 332 of the graphics pipeline 214. At block 1606, an auto-exposure stage 601 of the upscaler 332 processes a color buffer 320-1 of the rendered frame 502 to generate an exposure texture 604, which includes an exposure value(s) determined for the current frame, and a current luminance texture 606, which includes a current luminance value(s) for the rendered frame 502. At block 1608, an input color adjustment stage 603 of the upscaler 332, processes the exposure texture 604 and the color buffer 320-1 of the rendered frame 502 to generate an adjusted color buffer 608 and a luminance history texture 610, which includes historical luminance information/values for the rendered frame 502.

At block 1610, a reconstruct and dilate stage 605 of the upscaler 332 processes a depth buffer 322-1 and a motion vector buffer 504 of the rendered frame 502 to generate a previous depth buffer 616, a dilated depth buffer 612, and a dilated motion vector buffer 614 for the rendered frame 502. At block 1612, a depth clip stage 607 of the upscaler 332 processes the previous depth buffer 616, the dilated depth buffer 612, and the dilated motion vector buffer 614 to generate a disocclusion mask 618 for the rendered frame 502. At block 1614, a pixel locking stage 609 of the upscaler 332, processes the adjusted color buffer 608 to lock and generate a lock status texture 620 for one or more pixels of the rendered frame 502.

At block 1616, a reproject and accumulate stage 611 of the upscaler 332 processes the disocclusion mask 618, the dilated motion vector buffer 614, a reactivity mask 602 associated with pixels of the rendered frame 502, an output buffer 506-1 for the previously upscaled frame, the current luminance texture 606, the luminance history texture 610, the adjusted color buffer 608, and the lock status texture 620 to generate a super resolution (and anti-aliased) upscaled frame 508 that represents the rendered fame. The upscaled frame 508 has a second resolution that is greater than the first resolution of the rendered frame 502. At block 1618, a sharpening stage 613 of the upscaler 332 sharpens the upscaled frame 508. At block 1620, the sharpened upscale frame 508 is stored in a presentation buffer 626 for presentation on a display device 118. In one or more implementations, additional post-processing operations are performed on the upscaled frame 508 prior to presenting the upscaled frame 508 on the display device 118. The flow returns to block 1602 and the next rendered frame is processed by the upscaler 332.

Figure 18:
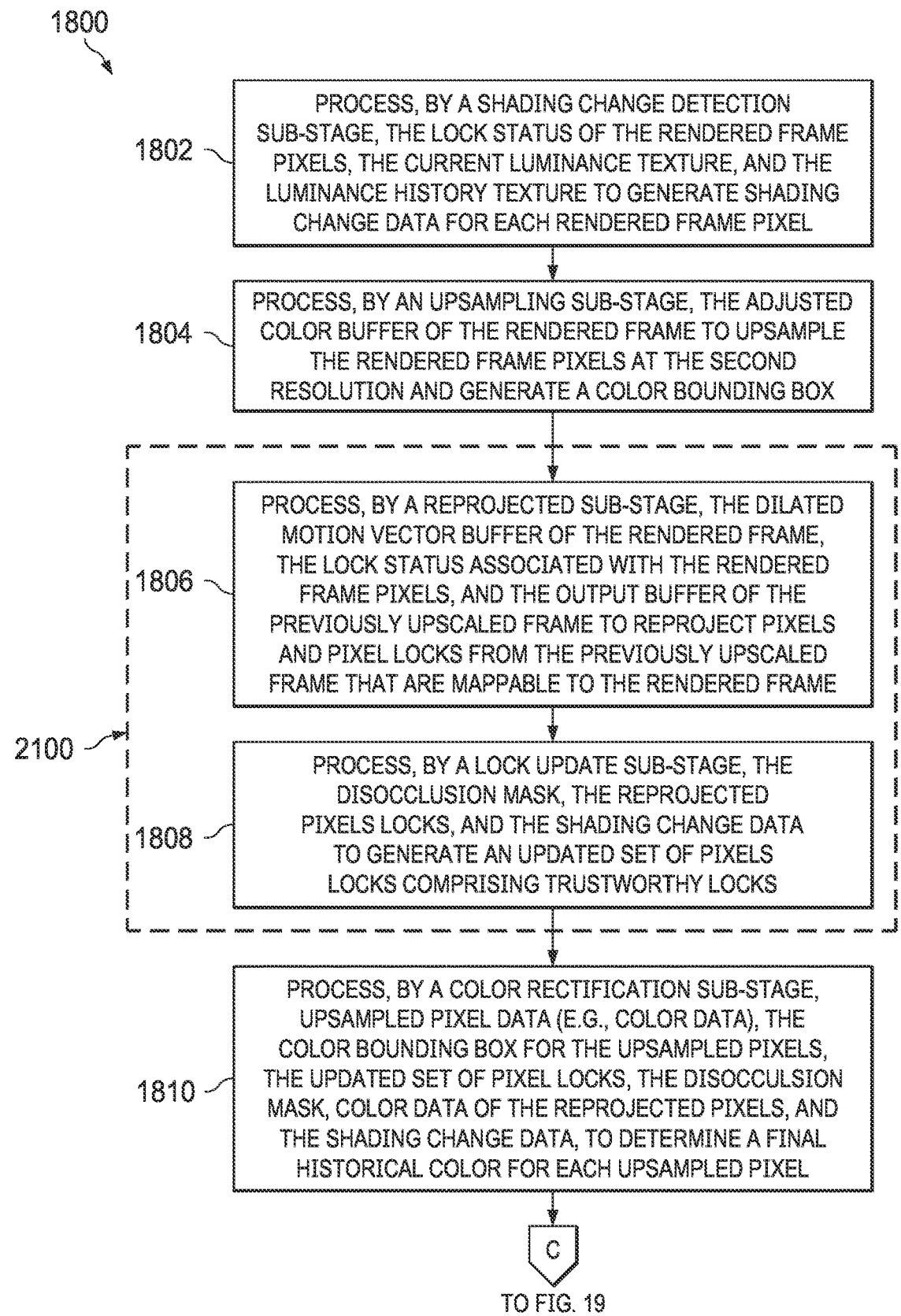
FIG. 18 and FIG. 19 together are a flow diagram illustrating a more detailed method of the reproject and accumulate process illustrated in block 1616 of FIG. 17 in accordance with some implementations.
Figure 19:
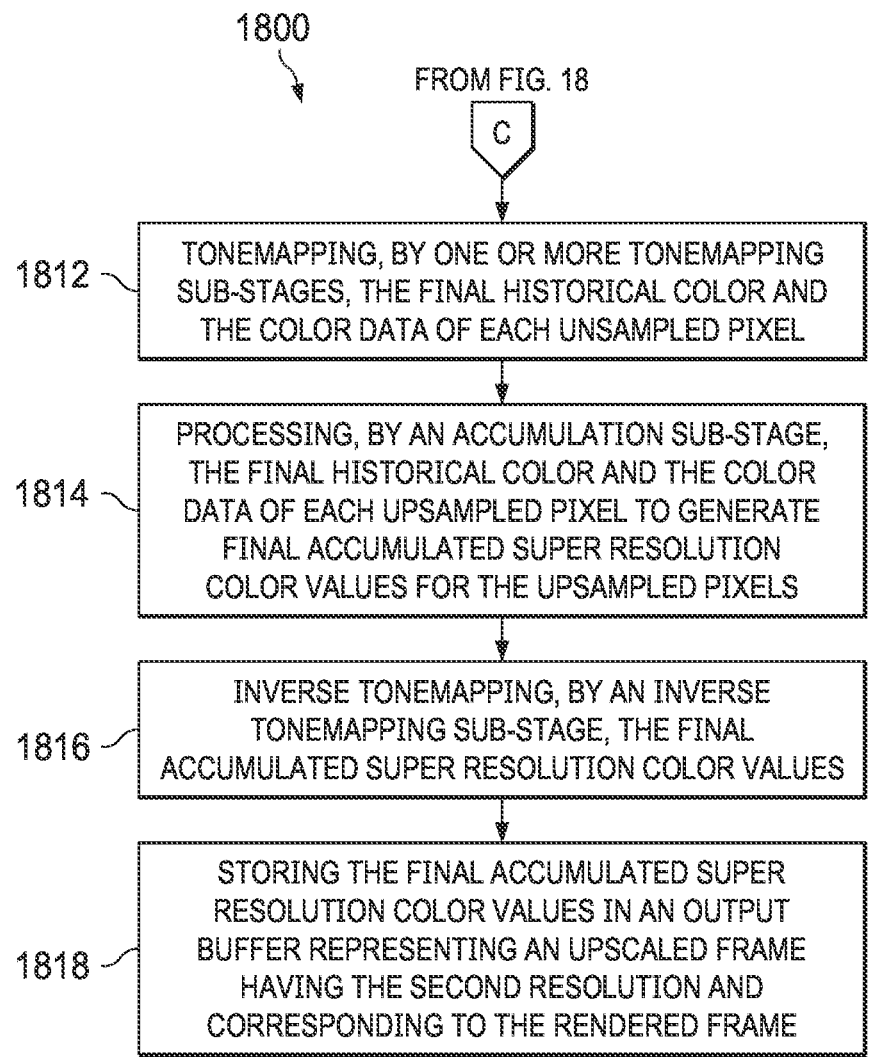

FIG. 18 and FIG. 19 together illustrate, in flow chart form, a more detailed method 1800 of the reproject and accumulate process illustrated in block 1616 of FIG. 17. It should be understood the processes described below with respect to method 1800 have been described above in greater detail with reference to FIG. 9 to FIG. 14. At block 1802, a shading change detection sub-stage 901, processes the lock status texture 620, the current luminance texture 606, and the luminance history texture 610 to generate shading change data 924 for each pixel of the rendered frame 502. At block 1804, an upsampling sub-stage 903 processes the adjusted color buffer 608 to upsample the pixels of the rendered frame 502 at the second resolution (i.e., target presentation resolution). The upsampling sub-stage 903 also generates a color bounding box 1102 for each upsampled pixel. At block 1806, a reproject sub-stage 905 processes the dilated motion vector buffer 614, the lock status texture 620, and the output buffer 506-1 of the previously upscaled frame to reproject pixel data (e.g., color data 922) and pixel locks 622 from the previously upscaled frame that are mappable to the rendered frame 502.

At block 1808, a lock update stage 907 processes the disocclusion mask 618, the reprojected pixel locks 622, and the shading change data 924 to generate an updated set of pixel locks 926 comprising trustworthy locks. Locks that are determined to not be trustworthy are released. At block 1810, a color rectification sub-stage 909 processes upsampled pixel data (e.g., color data 918), the color bounding box 1102 for the upsampled pixels, the updated set of pixel locks 926, the disocclusion mask 618, color data 922 of the reprojected pixels, and the shading change data 924 to determine final historical color data/values 928 for each upsampled pixel.

At block 1812, one or more tonemapping sub-stages 911 tonemap the final historical color data 928 and the color data 918 of the upsampled pixels. However, in at least some implementations, the tonemapping operations are optional. At block 1814, an accumulation sub-stage 913 processes the final historical color data 928 and the color data 918, which may have been tonemapped, to generate final accumulated super resolution color values 930 for the upsampled pixels. At block 1816, an inverse-tonemapping sub-stage 915 inverse-tonemaps the super resolution color values 930. However, in at least some implementations, the inverse-tonemapping operation is optional. At block 1818, the super resolution color values 930, which may have been inverse-tonemapped, are stored in an output buffer 506-2 representing an upscaled frame 508 having the second resolution and corresponding to the rendered frame 502.

Figure 20:
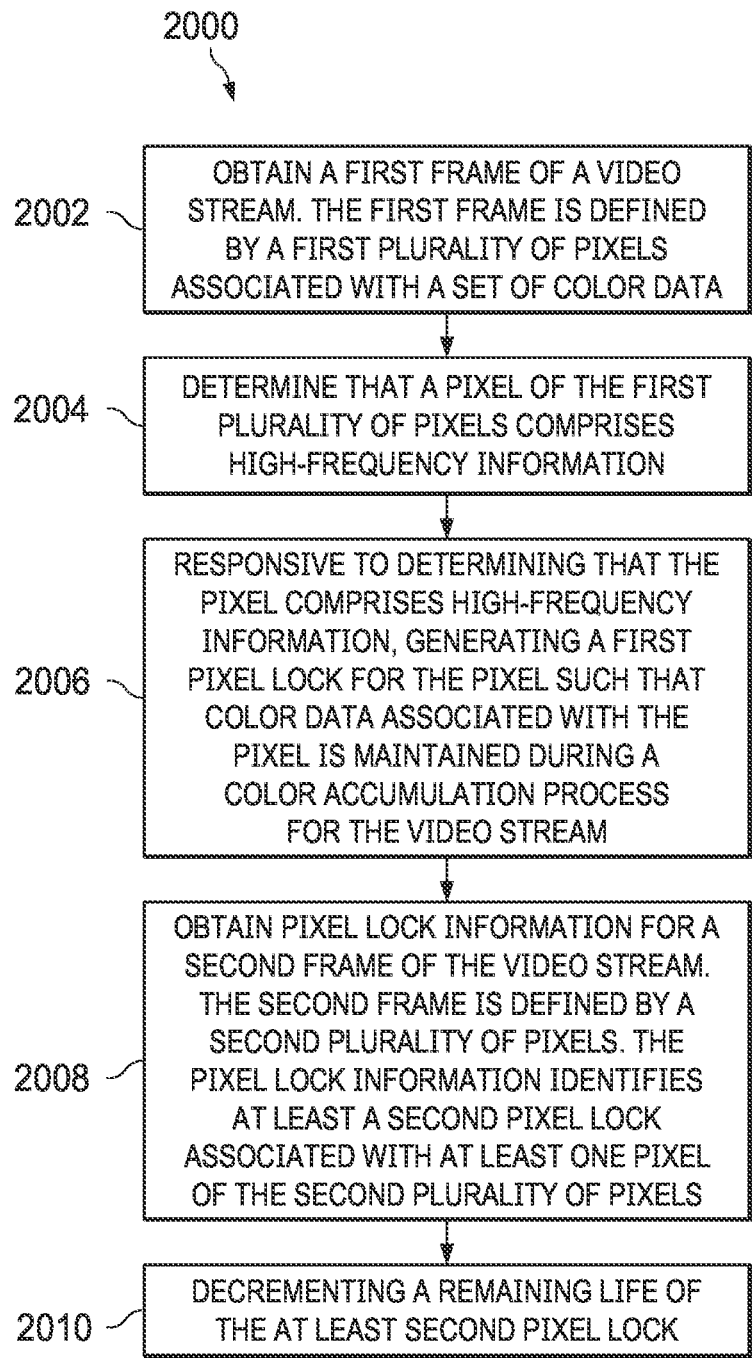
FIG. 20 is a flow diagram illustrating an overall method of a pixel locking process illustrated in accordance with some implementations.

FIG. 20 illustrates, in flow chart form, of an overall process for generating a pixel lock for one or more pixels. It should be understood the processes described below with respect to method 2000 have been described above in greater detail with reference to FIG. 9. At block 2002, the locking stage 609 obtains a first frame of a video stream. The first frame is defined by a first plurality of pixels associated with a second of color data. At block 2004, the locking stage 609 determines that a pixel of the first plurality of pixels comprises high-frequency information. At block 2006, responsive to determining that the pixel comprises high-frequency information, the locking stage 609 generates a first pixel lock for the pixel such that color data associated with the pixel is maintained during a color accumulation process for a subsequent frame. At block 2008, the locking stage 609 obtains pixel lock information for a second frame of the video stream. The second frame is defined by a second plurality of pixels. The pixel lock information identifies at least a second pixel lock associated with at least one pixel of the second plurality of pixels. At block 2010, the locking stage 609 decrements a remaining life of the at least second pixel lock.

Figure 21:
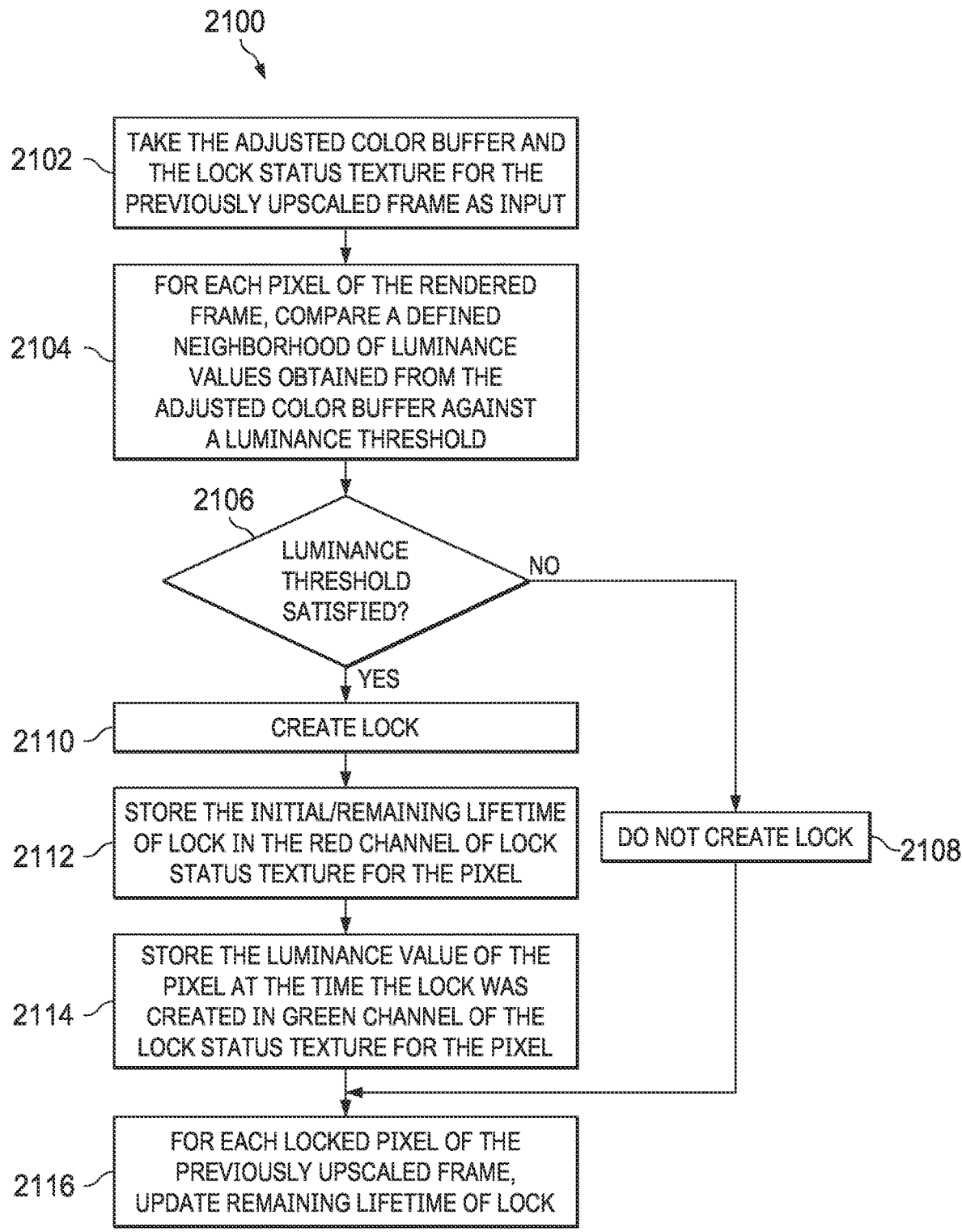
FIG. 21 is a flow diagram illustrating a more detailed method of the pixel locking process illustrated in block 1614 of FIG. 17 in accordance with some implementations.

FIG. 21 illustrates, in flow chart form, a more detailed method 2100 of the pixel locking process illustrated in block 1614 of FIG. 17. It should be understood the processes described below with respect to method 2100 have been described above in greater detail with reference to FIG. 9. At block 2102, the locking stage 609 of the upscaler 332 takes the adjusted color buffer 608 and the lock status texture 621 for the previously upscaled frame as input. At block 2104, for each pixel of the rendered frame 502, the locking stage 609 compares a defined neighborhood of luminance values obtained from the adjusted color buffer 608 against a luminance threshold. At block 2106, the locking stage 609 determines if the luminance threshold has been satisfied. At block 2108, if the luminance threshold has not been satisfied (e.g., the luminance change between the neighborhood pixels and the current pixel exceeds the luminance threshold), the locking stage 609 stage does not create a lock for the current pixel. The process flows to block 2106. At block 2110, if the luminance threshold has not been satisfied (e.g., the luminance change between the neighborhood pixels and the current pixel is below the luminance threshold), the locking stage 609 stage creates a lock for the current pixel. At block 2112, as part of creating the lock, the locking stage 609 stores a remaining lifetime of the lock in the red channel of the lock status texture 620 for the current pixel. Upon the initial creation of the lock, the pixel has its full lifetime remaining. At block 2114, the locking stage 609 stores the luminance value of the pixel at the time the lock was created in the green channel of the lock status texture 620 for the current pixel. At block 2116, for each locked pixel of the previously upscaled frame, the locking stage 609 updates the remaining lifetime of the lock in the red channel of the lock status texture 620 for the pixel.

Figure 22:
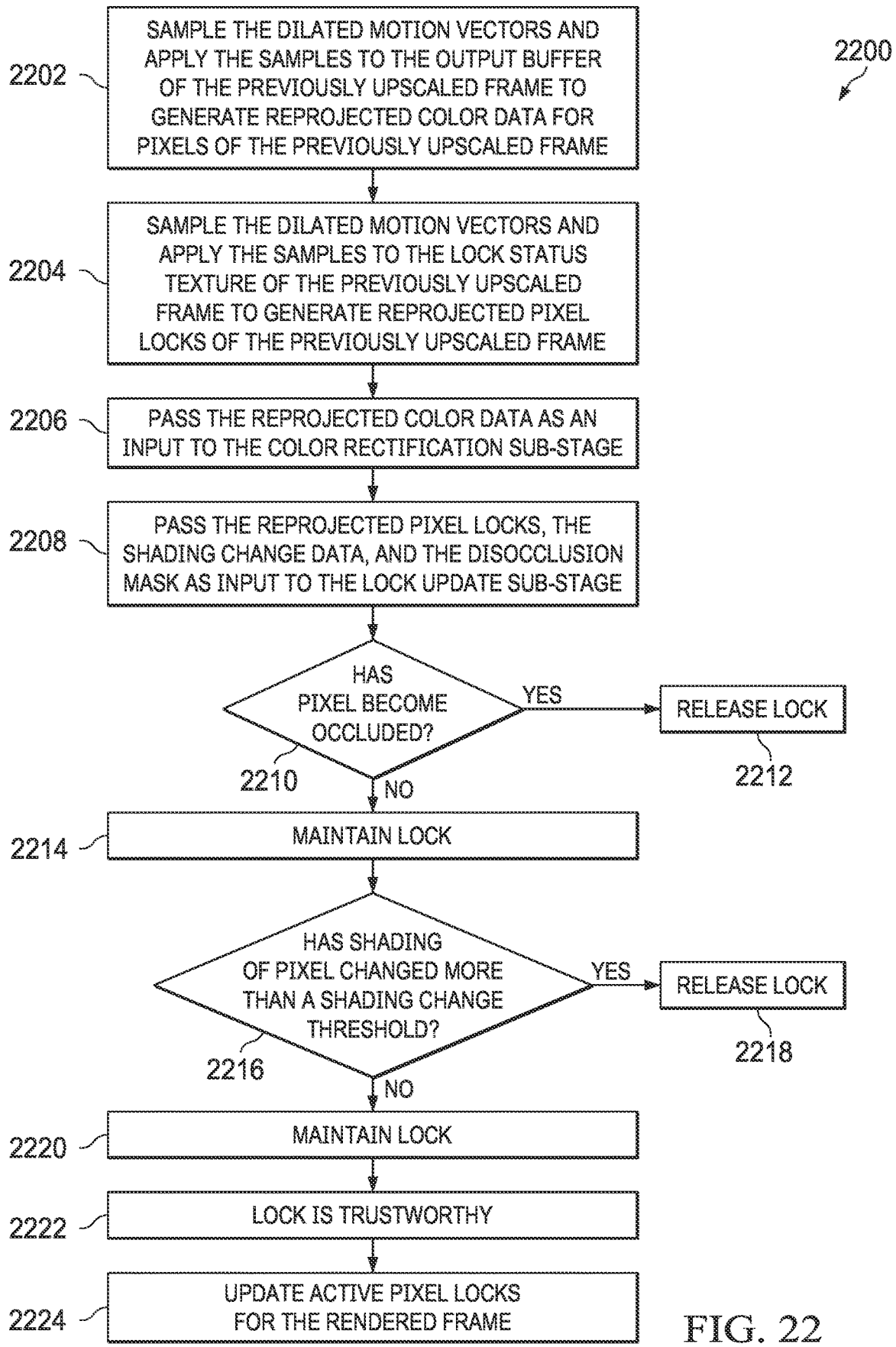
FIG. 22 is a flow diagram illustrating a more detailed method of the reprojection illustrated in block 1806 of FIG. 18 and the lock updating process illustrated in block 1808 of FIG. 18 in accordance with some implementations.

FIG. 22 illustrates, in flow chart form, a more detailed method 2200 of the reprojection illustrated in block 1806 of FIG. 18 and the lock updating process illustrated in block 1808 of FIG. 18. It should be understood the processes described below with respect to method 2200 have been described above in greater detail with reference to FIG. 9 and FIG. 12. At block 2202, the reproject sub-stage 905 samples the dilated motion vectors in the dilated motion vector buffer 614. The reproject sub-stage 905 applies the samples to the output buffer 506-1 of the previously upscaled frame to generate reprojected color data 922 for pixels of the previously upscaled frame. At block 2204, the reproject sub-stage 905 samples the dilated motion vectors and applies the samples to the lock status texture 620 of the previously upscaled frame to generate reprojected locks 622 for pixels of the previously upscaled frame. As described above, the dilated motion vectors are not applied to the lock status texture 620 of the previously upscaled frame for pixels whose lock status texture 620 in the rendered (current) frame indicates that a new pixel lock was generated in the rendered frame. At block 2206, the reproject sub-stage 905 passes the reprojected color data 922 as an input to the color rectification sub-stage 909. At block 2208, the reproject sub-stage 905 passes the reprojected locks 622 as an input to the lock update sub-stage 907.

At block 2210, for each reprojected pixel lock, the lock update sub-stage 907 determines if the associated pixel has become occluded based on the disocclusion mask 618. At block 2212, if the pixel has become occluded, the lock update sub-stage 907 releases the reprojected lock and processes the next reprojected pixel lock. At block 2214, if the pixel has not become occluded, the lock update sub-stage 907 maintains the reprojected pixel lock. Alternatively, or in addition to block 2212, the lock update sub-stage 907, at block 2216, determines if the shading of the pixel has changed more than a shading change threshold. At block 2218, if the shading of the pixel has changed more than the shading change threshold, the lock update sub-stage 907 releases the reprojected lock and processes the next reprojected pixel lock. At block 2220, if the shading of the pixel has not changed more than the shading change threshold, the lock update sub-stage 907 maintains the reprojected pixel lock. At block 2222, the lock update sub-stage 907 determines the lock is trustworthy. At block 2224, the lock update sub-stage 907 also updates any active pixel locks that were generated for the rendered frame by, for example, updating the luminance stored in the green channel and updating the trust/confidence factor stored in the blue channel. Once all the reprojected pixel locks and active pixel locks for the rendered frame have been processed, the lock update sub-stage 907 passes the updated set of pixel locks 926 to the color rectification sub-stage 909.

In some implementations, the apparatus and techniques described above are implemented in a system including one or more integrated circuit (IC) devices (also referred to as integrated circuit packages or microchips). Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some implementations, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific implementations. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific implementations. However, the benefits, advantages, solutions to problems, and any feature(s) that may cause any benefit, advantage, or solution to occur or become more pronounced are not to be construed as a critical, required, or essential feature of any or all the claims. Moreover, the particular implementations disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular implementations disclosed above may be altered or modified and all such variations are considered within the scope of the disclosed subject matter. Accordingly, the protection sought herein is as set forth in the claims below.

What is claimed is:

1. A method, at an accelerated processing device, comprising:
   obtaining a first frame of a video stream rendered at a first resolution, wherein the first frame is defined by a first plurality of pixels associated with a first set of color data;
   obtaining a second frame of the video stream upscaled to a second resolution that is greater than the first resolution, wherein the second frame is defined by a second plurality of pixels associated with a second set of color data;
   upsampling the first plurality of pixels to the second resolution, wherein the upsampling generates upsampled color data for the upsampled first plurality of pixels based on the first set of color data;
   accumulating the upsampled color data with the second set of color data to generate final color data for the upsampled first plurality of pixels, wherein color data of the second set of color data associated with a pixel lock contributes more to the final color data than corresponding color data of the upsampled color data; and
   storing the upsampled first plurality of pixels with the final color data as an upscaled frame representing the first frame at the second resolution.

2. The method of claim 1, further comprising:
   determining an exposure value of the first frame based on the first set of color data; and
   determining a current luminance of the first frame based on the first set of color data.

3. The method of claim 2, wherein determining the exposure value comprises performing downsampling of the first set of color data to store the exposure value at a 1×1 mipmap level, and wherein determining the current luminance comprises performing downsampling of the first set of color data to store the current luminance at a half resolution mipmap level.

4. The method of claim 1, further comprising converting the first set of color data from a first color space to a second color space prior to locking the one or more pixels and upsampling the first plurality of pixels.

5. The method of claim 1, further comprising:
   dilating depth values in a depth buffer of the first frame to generate a dilated depth buffer;
   dilating motion vectors in a motion vector buffer of the first frame to generate a dilated motion vector buffer;
   estimating, for each pixel of the first plurality of pixels, a depth value of the pixel in the second frame based on the dilated depth buffer and the dilated motion vector buffer; and
   storing the estimated depth values in a previous depth buffer.

6. The method of claim 5, further comprising:
   generating, for each pixel of the first plurality of pixels, a disocclusion mask based on the dilated depth buffer, the dilated motion vector buffer, and the previous depth buffer, wherein the disocclusion mask indicates an amount the pixel was disoccluded in the second frame.

7. The method of claim 1, further comprising:
   determining, for each pixel of the first plurality of pixels, an amount of shading change in the pixel between the first frame and the second frame; and
   generating, for each pixel of the first plurality of pixels, shading change data based on the amount of shading change determined for the pixel.

8. The method of claim 7, wherein determining the amount of shading change in the pixel comprises:
   responsive to the pixel being lock, comparing a luminance of the pixel when the lock was created to a shading change threshold; and
   responsive to the pixel unlocked, comparing a current luminance of the pixel with historical luminance information associated with the second frame.

9. The method of claim 1, wherein upsampling the first plurality of pixels to the second resolution comprises applying, for each pixel of the first plurality of pixels, a Lanczos resampling kernel to a neighborhood of pixels centered around the pixel.

10. The method of claim 9, further comprising:
    generating, for each pixel of the first plurality of pixels, a color space bounding box based on the neighborhood of pixels centered around the pixel.

11. The method of claim 1, further comprising:
    reprojecting the second set of color data to the first frame to generate reprojected color data.

12. The method of claim 11, wherein reprojecting the second set of color data comprises:
    sampling motion vectors from a motion vector buffer associated with the first frame; and
    applying the sampled motion vectors to the second set of color data of the second frame.

13. The method of claim 11, further comprising:
    reprojecting a set of pixel locks associated with the second plurality of pixels to generate reprojected pixel locks.

14. The method of claim 11, further comprising:
    determining, for each pixel of the upsampled first plurality of pixels, a final historical color value based on at least the reprojected color data of the second frame.

15. The method of claim 14, wherein determining the final historical color value comprises:
    determining one or more pixels of the second plurality of pixels that are disoccluded by applying a disocclusion mask to the reprojected color data;

reducing an influence of color data from the reprojected color data associated with the one or more pixels determines to be disoccluded on the final historical color value; and reducing an influence of color data from the reprojected color data based on a distance of the color data from a color space bounding box generated for the upsampled first plurality of pixels.

16. The method of claim 14, wherein accumulating the upsampled color data with the second set of color data comprises:

accumulating, for each pixel of the upsampled first plurality of pixels, the upsampled color data of the pixel with the final historical color value.

17. A system comprising:

a central processing unit; and an accelerated processing device, the accelerated processing device comprising:

a graphics processing pipeline comprising a plurality of stages including an upscaling stage, wherein the upscaling stage configured to:

obtain a first frame of a video stream rendered at a first resolution, wherein the first frame is defined by a first plurality of pixels associated with a first set of color data;

obtain a second frame of the video stream upscaled to a second resolution that is greater than the first resolution, wherein the second frame is defined by a second plurality of pixels associated with a second set of color data;

upsample the first plurality of pixels to the second resolution, wherein the upsampling generates upsampled color data for the upsampled first plurality of pixels based on the first set of color data;

accumulate the upsampled color data with the second set of color data to generate final color data for the upsampled first plurality of pixels, wherein color data of the second set of color data associated with a pixel lock contributes more to the final color data than corresponding color data of the upsampled color data; and store the upsampled first plurality of pixels with the final color data as an upscaled frame representing the first frame at the second resolution.

18. The system of claim 17, wherein the upscaling stage is further configured to:

reproject the second set of color data to the first frame to generate reprojected color data; and determine, for each pixel of the upsampled first plurality of pixels, a final historical color value based on the reprojected color data of the second frame.

19. The system of claim 18, wherein the upscaling stage is configured to accumulate the upsampled color data with the second set of color data by:

accumulating, for each pixel of the upsampled first plurality of pixels, the upsampled color data of the pixel with the final historical color value.

20. A non-transitory computer readable medium embodying a set of executable instructions, the set of executable instructions to manipulate at least one processor to:

obtain a first frame of a video stream rendered at a first resolution, wherein the first frame is defined by a first plurality of pixels associated with a first set of color data;

obtain a second frame of the video stream upscaled to a second resolution that is greater than the first resolution, wherein the second frame is defined by a second plurality of pixels associated with a second set of color data;

upsample the first plurality of pixels to the second resolution, wherein the upsampling generates upsampled color data for the upsampled first plurality of pixels based on the first set of color data;

accumulate the upsampled color data with the second set of color data to generate final color data for the upsampled first plurality of pixels, wherein color data of the second set of color data associated with a pixel lock contributes more to the final color data than corresponding color data of the upsampled color data; and store the upsampled first plurality of pixels with the final color data as an upscaled frame representing the first frame at the second resolution.

* * * * *